US011985647B2

(12) United States Patent
Ryu et al.

(10) Patent No.: US 11,985,647 B2
(45) Date of Patent: May 14, 2024

(54) SIDELINK GROUPCAST BEAM TRAINING

(71) Applicant: QUALCOMM incorporated, San Diego, CA (US)

(72) Inventors: Jung Ho Ryu, Fort Lee, NJ (US); Sony Akkarakaran, Poway, CA (US); Tao Luo, San Diego, CA (US); Kapil Gulati, Belle Mead, NJ (US); Hong Cheng, Basking Ridge, NJ (US); Juan Montojo, San Diego, CA (US); Mahmoud Taherzadeh Boroujeni, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/072,024

(22) Filed: Oct. 15, 2020

(65) Prior Publication Data
US 2021/0127381 A1 Apr. 29, 2021

Related U.S. Application Data

(60) Provisional application No. 62/925,718, filed on Oct. 24, 2019.

(51) Int. Cl.
*H04W 72/044* (2023.01)
*H04L 1/1607* (2023.01)
(Continued)

(52) U.S. Cl.
CPC ......... *H04W 72/046* (2013.01); *H04L 1/1607* (2013.01); *H04W 72/23* (2023.01); *H04W 72/30* (2023.01)

(58) Field of Classification Search
None
See application file for complete search history.

(56) References Cited

U.S. PATENT DOCUMENTS 9,572,063 B2 2/2017 Etemad et al.
2009/0180451 A1 7/2009 Alpert et al.
(Continued)

FOREIGN PATENT DOCUMENTS

WO WO-2017111883 A1 * 6/2017 ........... H04B 7/0408
WO 2018024080 A1 2/2018
(Continued)

OTHER PUBLICATIONS

ZTE: "Initial Consideration on NR V2X Resource Allocation", 3GPP Draft, 3GPP TSG-RAN WG2#103bis, R2-1814168 Initial Consideration on NR V2X Resource Allocation, 3rd Generation Partnership Project (3GPP), Mobile Competence Centre, 650, Route Des Lucioles, F-06921, Sophia-Antipolis Cedex, vol. RAN WG2, Sep. 28, 2018 (Sep. 28, 2018), 7 pages, XP051523625, Retrieved from the Internet: URL: http://www.3gpp.org/ftp/tsg%5Fran/WG2% 5FRL2/TSGR2%5F103bis/Docs/R2%2D1814168%2Ezip, [retrieved on Dec. 11, 2018], Sections 1-3.
(Continued)

*Primary Examiner* — Nicholas Sloms
(74) *Attorney, Agent, or Firm* — Holland & Hart LLP/QUALCOMM Incorporated

(57) ABSTRACT

Methods, systems, and devices for sidelink groupcast communications are described. A user equipment (UE) may transmit a beam training request to a base station to determine beams for use with other UEs in a sidelink groupcast communications group. The base station may receive the beam training request, identify wireless resources that a group of UEs may use to perform beam training, and may transmit a beam training grant to each UE of the group of UEs. The UE may transmit a number of training beams using the wireless resources provided in the beam training grant, and the other UEs may measure received signals on the wireless resources to identify one or more beams. Each UE
(Continued)

may provide a beam training report to the base station. The base station, based on the beam training reports, may determine beams and resources for use in the groupcast sidelink communications.

49 Claims, 21 Drawing Sheets

(51) Int. Cl.
*H04W 72/23* (2023.01)
*H04W 72/30* (2023.01)

(56) References Cited

U.S. PATENT DOCUMENTS

| | | | |
|---|---|---|---|
| 2010/0214169 A1* | 8/2010 | Kafle | H01Q 3/26 |
| | | | 342/368 |
| 2011/0244800 A1 | 10/2011 | Bogestam et al. | |
| 2012/0120892 A1 | 5/2012 | Freda et al. | |
| 2013/0294318 A1* | 11/2013 | Amerga | H04W 4/06 |
| | | | 370/312 |
| 2015/0011230 A1 | 1/2015 | Noh et al. | |
| 2016/0338095 A1 | 11/2016 | Faurie et al. | |
| 2017/0171837 A1 | 6/2017 | Chen et al. | |
| 2018/0035448 A1 | 2/2018 | Gupta et al. | |
| 2018/0049219 A1 | 2/2018 | Gupta et al. | |
| 2018/0091262 A1* | 3/2018 | Jung | H04L 1/1825 |
| 2018/0139724 A1 | 5/2018 | Loehr et al. | |
| 2018/0206257 A1 | 7/2018 | Lee et al. | |
| 2018/0249453 A1* | 8/2018 | Nagaraja | H04B 7/0617 |
| 2019/0045569 A1 | 2/2019 | Abedini et al. | |
| 2019/0159188 A1 | 5/2019 | Sadiq et al. | |
| 2019/0174346 A1* | 6/2019 | Murray | H04B 7/0408 |
| 2019/0268918 A1 | 8/2019 | Baghel et al. | |
| 2019/0372647 A1* | 12/2019 | Su | H04W 16/28 |
| 2020/0022089 A1 | 1/2020 | Guo | |
| 2020/0092685 A1 | 3/2020 | Fehrenbach et al. | |
| 2020/0119895 A1 | 4/2020 | Choi et al. | |
| 2020/0178221 A1 | 6/2020 | Byun et al. | |
| 2020/0187236 A1 | 6/2020 | Moon et al. | |
| 2021/0127403 A1 | 4/2021 | Ryu et al. | |
| 2021/0127404 A1 | 4/2021 | Ryu et al. | |
| 2021/0168574 A1* | 6/2021 | Zhang | H04L 5/0048 |
| 2021/0175943 A1* | 6/2021 | Xu | H04W 76/14 |
| 2021/0219268 A1* | 7/2021 | Li | H04W 72/20 |
| 2021/0274545 A1 | 9/2021 | Adjakple et al. | |
| 2021/0344407 A1* | 11/2021 | Huang | H04B 7/088 |
| 2021/0345396 A1 | 11/2021 | Yu et al. | |
| 2022/0007403 A1 | 1/2022 | Li et al. | |
| 2022/0132603 A1* | 4/2022 | Adjakple | H04W 8/005 |
| 2023/0055878 A1 | 2/2023 | Ryu et al. | |

FOREIGN PATENT DOCUMENTS

| | | |
|---|---|---|
| WO | WO-2019009454 A1 | 1/2019 |
| WO | 2019036578 A1 | 2/2019 |
| WO | WO-2019160973 A1 | 8/2019 |
| WO | WO-2019187423 A1 | 10/2019 |
| WO | WO-2021062400 A1 | 4/2021 |

OTHER PUBLICATIONS

International Search Report and Written Opinion—PCT/US2020/056005—ISA/EPO—dated Dec. 11, 2020 (200173WO).

Huawei, et al., "Sidelink Physical Layer Procedures for NR V2X", 3GPP TSG RAN WG1 Meeting #96, 3GPP Draft; R1-1901537, 3rd Generation Partnership Project (3GPP), Mobile Competence Centre; 650, Route Des Lucioles; F-06921 Sophia-Antipolis Cedex; France, Mar. 1, 2019 (Mar. 1, 2019), pp. 1-16, XP051599234, Retrieved from the Internet: URL: http://www.3gpp.orgjftpjtsg%5Fran/WG1%5FRL1/TSGR1%5F96/Docs/R1%2D1901537%2Ezip pp. 1-13.

Huawei, et al., "Sidelink Resource Allocation Mechanism for NR V2X", 3GPP TSG RAN WG1 Meeting #94bis, 3GPP Draft; R1-1811904 Updated V1 Clean, 3rd Generation Partnership Project (3GPP), Mobile Competence Centre; 650, Route Des Lucioles; F-06921 Sophia-Antipolis Cedex; France vol. RAN WG1, no. Chengdu, China; Oct. 8, 2018-Oct. 12, 2018, Oct. 10, 2018 (Oct. 10, 2018), 13 Pages, XP051519227, Retrieved from the Internet: URL: http://www.3gpp.org/ftp/tsg%5Fran/WG1%5FRL1/TSGR1%5F94b/Docs/R1%2D1811904%2Ezip, [retrieved on Oct. 10, 2018].

Vivo: "Enhancements of Uu Link to Control Sidelink", 3GPP Draft, 3GPP TSG RAN WG1 Meeting #95, R1 -1812310, Enhancements of Uu Link To Control Sidelink, 3rd Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 3, 2018 (Nov. 3, 2018), XP051478499, 5 pages, Retrieved from the Internet: URL:http://www.3gpp.org/ftp/tsg%5Fran/WG1%5FRL1/TSGR1%5F95/Docs/R1%2D1812310%2Ezip [retrieved on Nov. 3, 2018] Section 2.

Taiwan Search Report—TW109136108—TIPO—Feb. 4, 2024.

\* cited by examiner

SIDELINK GROUPCAST BEAM TRAINING

CROSS REFERENCE

The present Application for Patent claims the benefit of U.S. Provisional Patent Application No. 62/925,718 by RYU et al., entitled "SIDELINK GROUPCAST BEAM TRAINING," filed Oct. 24, 2019, assigned to the assignee hereof, and expressly incorporated by reference herein.

INTRODUCTION

The following relates generally to wireless communications, and more specifically to beam training techniques in sidelink groupcast communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a first UE is described. The method may include transmitting, to a base station, a sidelink beam training request for groupcast sidelink communications with a set of other UEs, receiving, from the base station, a beam training grant that indicates resources for beam training between the first UE and the set of other UEs, performing a beam training procedure based on the beam training grant, and transmitting a beam training report to the base station.

An apparatus for wireless communication at a first UE is described. The apparatus may include a processor, memory coupled to the processor, the processor and memory configured to transmit, to a base station, a sidelink beam training request for groupcast sidelink communications with a set of other UEs, receive, from the base station, a beam training grant that indicates resources for beam training between the first UE and the set of other UEs, perform a beam training procedure based on the beam training grant, and transmit a beam training report to the base station.

Another apparatus for wireless communication at a first UE is described. The apparatus may include means for transmitting, to a base station, a sidelink beam training request for groupcast sidelink communications with a set of other UEs, receiving, from the base station, a beam training grant that indicates resources for beam training between the first UE and the set of other UEs, performing a beam training procedure based on the beam training grant, and transmitting a beam training report to the base station.

A non-transitory computer-readable medium storing code for wireless communication at a first UE is described. The code may include instructions executable by a processor to transmit, to a base station, a sidelink beam training request for groupcast sidelink communications with a set of other UEs, receive, from the base station, a beam training grant that indicates resources for beam training between the first UE and the set of other UEs, perform a beam training procedure based on the beam training grant, and transmit a beam training report to the base station.

Some examples of the method, apparatuses, and non-transitory computer-readable medium described herein may further include operations, features, means, or instructions for receiving, from the base station, a beam training report grant that indicates resources for communicating the beam training report.

In some examples of the method, apparatuses, and non-transitory computer-readable medium described herein, the sidelink beam training request indicates a requested number of beams for transmitting beam training signals.

In some examples of the method, apparatuses, and non-transitory computer-readable medium described herein, the sidelink beam training request indicates a preference for transmitting to a sub-group of UEs that may be capable of groupcast sidelink communications.

Some examples of the method, apparatuses, and non-transitory computer-readable medium described herein may further include operations, features, means, or instructions for receiving, from the base station, a sidelink groupcast communications grant for transmission of a sidelink groupcast communication to the set of other UEs, and where the set of other UEs may be in the sub-group of UEs.

In some examples of the method, apparatuses, and non-transitory computer-readable medium described herein, the performing the beam training procedure may include operations, features, means, or instructions for transmitting a training signal on each of two or more transmission beams for measurement by the set of other UEs.

In some examples of the method, apparatuses, and non-transitory computer-readable medium described herein, the beam training report indicates one or more of a resource in which a training signal was transmitted, identifications of one or more training beams, a received signal quality of a training signal received, beams used to receive the training signal, a resource in which the training signal was received, or any combinations thereof.

In some examples of the method, apparatuses, and non-transitory computer-readable medium described herein, the beam training report indicates a subset of the set of other UEs that may be reachable by the first UE.

In some examples of the method, apparatuses, and non-transitory computer-readable medium described herein, a connectivity map can be deduced from the beam training report.

Some examples of the method, apparatuses, and non-transitory computer-readable medium described herein may further include operations, features, means, or instructions for transmitting one or more groupcast sidelink transmissions to the set of other UEs, and receiving acknowledgement feedback that indicates whether the one or more groupcast sidelink transmissions were successfully received at the set of other UEs.

In some examples of the method, apparatuses, and non-transitory computer-readable medium described herein, the acknowledgement feedback may be received from the base station, and where each of the set of other UEs transmits associated acknowledgment feedback to the base station.

In some examples of the method, apparatuses, and non-transitory computer-readable medium described herein, the acknowledgement feedback may be received from each of the set of other UEs via a sidelink connection with the first UE.

Some examples of the method, apparatuses, and non-transitory computer-readable medium described herein may further include operations, features, means, or instructions for performing a second beam training procedure with the set of other UEs to establish the sidelink connection for acknowledgement feedback.

Some examples of the method, apparatuses, and non-transitory computer-readable medium described herein may further include operations, features, means, or instructions for receiving, responsive to the beam training report, a sidelink grant from the base station that indicates sidelink resources for groupcast sidelink communications with the set of other UEs.

In some examples of the method, apparatuses, and non-transitory computer-readable medium described herein, the sidelink grant may be received in a downlink control information (DCI) message from the base station.

In some examples of the method, apparatuses, and non-transitory computer-readable medium described herein, the DCI message indicates one or more of an identification of a groupcast transmitting UE for the groupcast sidelink communications, a list of at least one other UE that may be to receive the groupcast sidelink communications, a transmission beam that may be to be used by the groupcast transmitting UE, the sidelink resources for the groupcast sidelink communications, or any combinations thereof.

A method of wireless communication at a base station is described. The method may include receiving, from a first UE, a sidelink beam training request for groupcast sidelink communications between the first UE and a set of other UEs, transmitting, responsive to the sidelink beam training request, a beam training grant to each of the first UE and the set of other UEs that indicates resources for beam training between the first UE and the set of other UEs, and receiving a beam training report from the first UE, one or more of the set of other UEs, or both that indicates sidelink beam measurements associated with the beam training grant.

An apparatus for wireless communication at a base station is described. The apparatus may include a processor, memory coupled to the processor, the processor and memory configured to receive, from a first UE, a sidelink beam training request for groupcast sidelink communications between the first UE and a set of other UEs, transmit, responsive to the sidelink beam training request, a beam training grant to each of the first UE and the set of other UEs that indicates resources for beam training between the first UE and the set of other UEs, and receive a beam training report from the first UE, one or more of the set of other UEs, or both that indicates sidelink beam measurements associated with the beam training grant.

Another apparatus for wireless communication at a base station is described. The apparatus may include means for receiving, from a first UE, a sidelink beam training request for groupcast sidelink communications between the first UE and a set of other UEs, transmitting, responsive to the sidelink beam training request, a beam training grant to each of the first UE and the set of other UEs that indicates resources for beam training between the first UE and the set of other UEs, and receiving a beam training report from the first UE, one or more of the set of other UEs, or both that indicates sidelink beam measurements associated with the beam training grant.

A non-transitory computer-readable medium storing code for wireless communication at a base station is described. The code may include instructions executable by a processor to receive, from a first UE, a sidelink beam training request for groupcast sidelink communications between the first UE and a set of other UEs, transmit, responsive to the sidelink beam training request, a beam training grant to each of the first UE and the set of other UEs that indicates resources for beam training between the first UE and the set of other UEs, and receive a beam training report from the first UE, one or more of the set of other UEs, or both that indicates sidelink beam measurements associated with the beam training grant.

Some examples of the method, apparatuses, and non-transitory computer-readable medium described herein may further include operations, features, means, or instructions for transmitting a beam training report grant to the first UE, one or more of the set of other UEs, or both that indicates resources for communicating the beam training report.

In some examples of the method, apparatuses, and non-transitory computer-readable medium described herein, the sidelink beam training request indicates a requested number of beams for transmitting beam training signals, and where the beam training grant may be determined based on the requested number of beams.

In some examples of the method, apparatuses, and non-transitory computer-readable medium described herein, the sidelink beam training request indicates a preference for transmitting to a sub-group of UEs that may be capable of groupcast sidelink communications, and where the beam training grant may be determined based on the preference.

In some examples of the method, apparatuses, and non-transitory computer-readable medium described herein, the beam training report indicates one or more of a resource in which a training signal was transmitted, identifications of one or more training beams, a received signal quality of a training signal received, beams used to receive the training signal, a resource in which the training signal was received, or any combination thereof.

In some examples of the method, apparatuses, and non-transitory computer-readable medium described herein, the beam training report from each UE indicates a subset of the set of other UEs that may be reachable by the UE.

Some examples of the method, apparatuses, and non-transitory computer-readable medium described herein may further include operations, features, means, or instructions for determining a UE connectivity map based on the beam training report from each UE.

Some examples of the method, apparatuses, and non-transitory computer-readable medium described herein may further include operations, features, means, or instructions for receiving acknowledgement feedback from the set of other UEs that indicates whether one or more groupcast sidelink transmissions were successfully received from the first UE, and transmitting an indication to the first UE that includes the acknowledgement feedback.

Some examples of the method, apparatuses, and non-transitory computer-readable medium described herein may further include operations, features, means, or instructions for receiving a request for a second beam training procedure for the set of other UEs to establish a sidelink connection with the first UE for transmitting acknowledgement feedback directly to the first UE, and transmitting a second beam training grant to each of the first UE and the set of other UEs responsive to the request for the second beam training procedure.

Some examples of the method, apparatuses, and non-transitory computer-readable medium described herein may further include operations, features, means, or instructions for transmitting a sidelink grant to the first UE and the set of other UEs that indicates sidelink resources for groupcast sidelink communications between the first UE and the set of other UEs based on the beam training report.

In some examples of the method, apparatuses, and non-transitory computer-readable medium described herein, the sidelink grant may be transmitted in a DCI message.

In some examples of the method, apparatuses, and non-transitory computer-readable medium described herein, the DCI message indicates one or more of an identification of a groupcast transmitting UE for the groupcast sidelink communications, a list of at least one other UE that may be to receive the groupcast sidelink communications, a transmission beam that may be to be used by the groupcast transmitting UE, the sidelink resources for the groupcast sidelink communications, or any combinations thereof.

A method of wireless communication at a first UE of a set of UEs is described. The method may include receiving, from the base station, a beam training grant that indicates resources for beam training between the plurality of UEs and the first UE, wherein the beam training grant is associated with groupcast beam training, performing a beam training procedure based on the beam training grant, and transmitting a beam training report to the base station, a second UE of the plurality of UEs, or both.

An apparatus for wireless communication at a first UE of a set of UEs is described. The apparatus may include a processor, memory coupled to the processor, the processor and memory configured to receive, from the base station, a beam training grant that indicates resources for beam training between the plurality of UEs and the first UE, wherein the beam training grant is associated with groupcast beam training, perform a beam training procedure based on the beam training grant, and transmit a beam training report to the base station, a second UE of the plurality of UEs, or both.

Another apparatus for wireless communication at a first UE of a set of UEs is described. The apparatus may include means for receiving, from the base station, a beam training grant that indicates resources for beam training between the plurality of UEs and the first UE, wherein the beam training grant is associated with groupcast beam training, means for performing a beam training procedure based on the beam training grant, and means for transmitting a beam training report to the base station, a second UE of the plurality of UEs, or both.

A non-transitory computer-readable medium storing code for wireless communication at a first UE of a set of UEs is described. The code may include instructions executable by a processor to receive, from the base station, a beam training grant that indicates resources for beam training between the plurality of UEs and the first UE, wherein the beam training grant is associated with groupcast beam training, perform a beam training procedure based on the beam training grant, and transmit a beam training report to the base station, a second UE of the plurality of UEs, or both.

DETAILED DESCRIPTION

Figure 1:
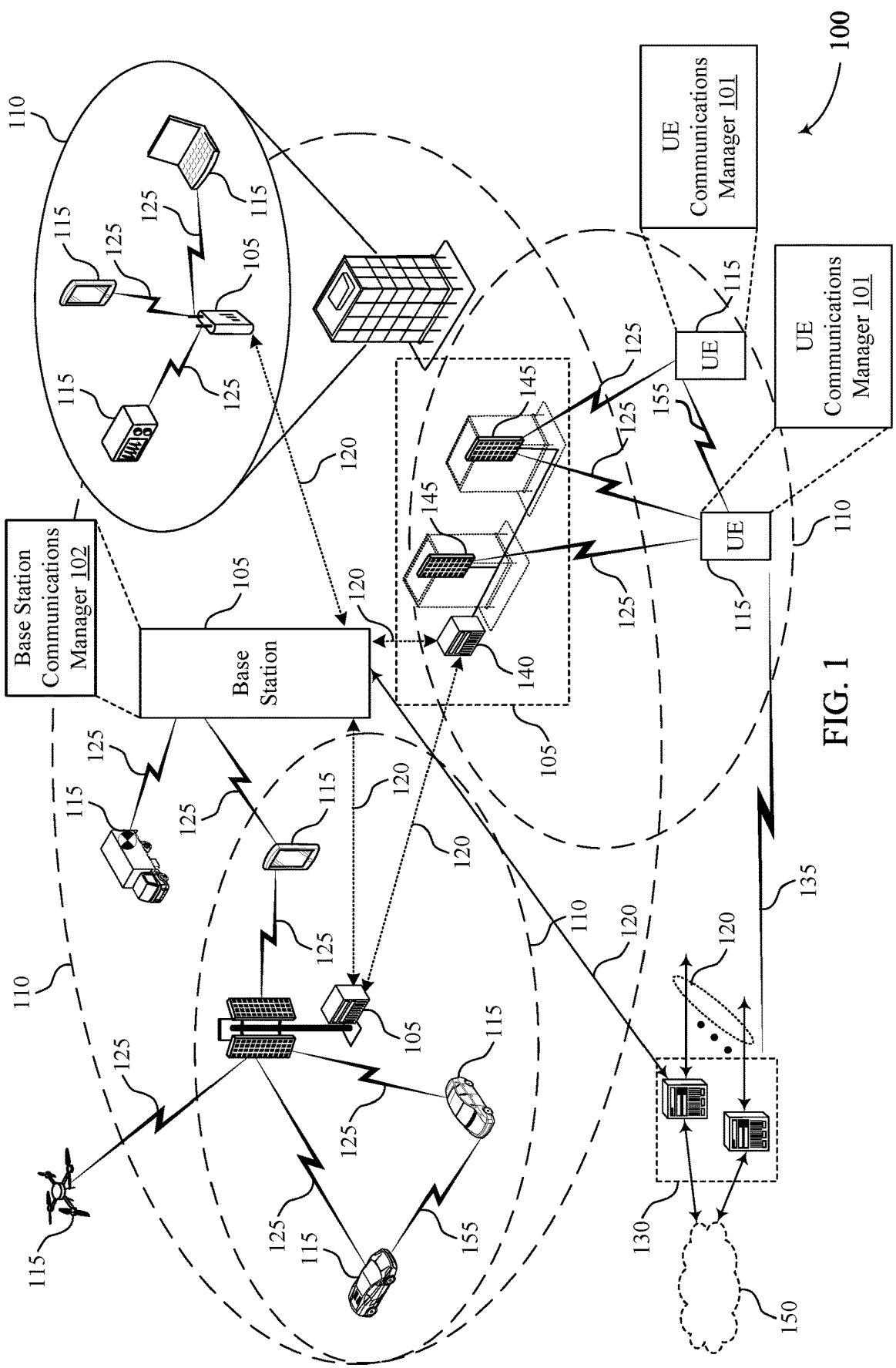
FIG. 1 illustrates an example of a wireless communications system that supports sidelink groupcast beam training in accordance with one or more aspects of the present disclosure.

A wireless communications system may support both access links and sidelinks for communications between wireless devices. An access link may refer to a communication link between a UE and a base station. For example, an access link may support uplink signaling, downlink signaling, connection procedures, etc. A sidelink may refer to any communication link between similar wireless devices (e.g., a communication link between UEs, a backhaul communication link between base stations, etc.). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one wireless device to one or more other wireless devices.

As demand for sidelink communication increases, (e.g., due to increased V2X demand for autonomous and semi-autonomous vehicles, D2D communication between Internet-of-Things (IoT) devices, factory automation etc.), techniques to efficiently and reliably enhance throughput and reliability of sidelink channels is desirable. In some cases, sidelink groupcast communications may be desired, in which one transmitting device may transmit signals to multiple other devices (e.g., a vehicle that transmits sensor data to multiple other vehicles via sidelink communications). Techniques such as discussed in various aspects of the present disclosure provide for sidelink groupcast communications in which directional transmission/reception beams used for wireless communications between devices of a group of sidelink devices may be identified. Beam identification may be determined based on one or more measurements made by sidelink devices of training beams transmitted by another sidelink device.

In some cases, a first UE may be a transmitting UE that is to transmit groupcast sidelink communications to multiple other UEs of a group of UEs (e.g., two or more UEs). Further, the sidelink communications may utilize directional beamforming in which directional beams may be used for communications. In order to determine one or more preferred directional beams for communications, the UEs of the group may perform a beam training procedure in which the first UE transmits a series of transmissions using a number of different beams, and the multiple other UEs may measure received signal characteristics of the series of different beams to identify one or more preferred beams. Each of the multiple other UEs may transmit a beam report to the base station, which may then provide beam-related information to the first UE for use in transmitting a groupcast communication to the multiple other UEs of the group.

In some cases, the first UE may transmit a beam training request to the base station. The base station may receive the beam training request, and identify wireless resources that the group of UEs may use to perform beam training for sidelink groupcast communications, and may transmit a beam training grant to each UE of the group of UEs. Based on the beam training grant, the first UE may transmit a number of training beams using the wireless resources provided in the beam training grant, and the other UEs may measure received signals on the wireless resources to identify one or more preferred beams. Each UE may provide a beam training report to the base station. In some examples, the base station may transmit a beam training report grant which may indicate the resources on which each UE will communicate the beam training report to the base station. The base station, based on the beam training reports, may determine beams for use in the groupcast sidelink communications, may forward report information to the first UE to determine beams for use in the groupcast sidelink communications, or combinations thereof. The base station may provide a resource grant for subsequent groupcast sidelink communications, which the first UE may use to transmit to the multiple other UEs using the identified beams.

In some cases, UEs that receive sidelink groupcast communications from the first UE may transmit acknowledgment feedback (e.g., hybrid acknowledgment repeat request (HARQ) acknowledgment/negative-acknowledgment (ACK/NACK) feedback) to indicate whether the communication was successfully received. In some cases, the acknowledgment feedback may be transmitted to the base station, and the base station may forward feedback information to the first UE. In other cases, the acknowledgment feedback may be transmitted to the first UE. In some cases, when the acknowledgment feedback is transmitted to the first UE directly, one or more subsequent beam training procedures may be performed in order to identify beams for the multiple other UEs to use to transmit the acknowledgment feedback.

Techniques such as discussed herein thus provide for enhanced reliability and efficiency in determining beams for sidelink groupcast communications. For example, by enabling the efficient determination of beams for sidelink communications, sidelink groupcast communications may be efficiently established with reliable connections. Additionally, by providing beam training resources based on a request by a transmitting UE, beam training and resource scheduling may be provided as needed at the UE, and up-to-date parameters may be used to determine beams, further enhancing reliability and efficiency. Further, received beam training reports from multiple UEs may be used to determine a connectivity map, which may be used to determine which UEs are able to communicate with other UEs, and which may be used to make efficient scheduling determinations for communications among UEs.

Aspects of the disclosure are initially described in the context of exemplary wireless communications systems. Aspects of the disclosure are further illustrated by and described with reference to process flows, apparatus diagrams, system diagrams, and flowcharts that relate to sidelink groupcast beam training.

FIG. 1 illustrates an example of a wireless communications system 100 that supports sidelink groupcast beam training in accordance with one or more aspects of the present disclosure. The wireless communications system 100 may include one or more base stations 105 (e.g., gNodeBs (gNBs), and/or radio heads (RHs)), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. A UE 115 may communicate with the core network 130 through communication link 135.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link (e.g., a sidelink communication link 155) may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both. Further, in some cases, groupcast communications among a group of UEs 115 may be performed via sidelink communication links 155, and configuration of beams for use in sidelink groupcast communications may be performed according to various aspects discussed herein.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

UEs 115 may include a UE communications manager 101, which may transmit a sidelink beam training request for groupcast sidelink communications to a base station 105, receive a beam training grant responsive to the beam training request, and perform a beam training procedure with multiple other UEs based on the beam training grant, to establish a set of beams for sidelink groupcast communications.

One or more of the base stations 105 may include a base station communications manager 102, which may receive a sidelink beam training request for groupcast sidelink communications from a UE 115, and transmit a beam training grant to multiple UEs of the sidelink groupcast communications group for use in performing a beam training procedure. The base station communications manager 102 may receive, from the multiple UEs, a beam training report that may be used to identify one or more preferred beams for sidelink groupcast communications among the group of UEs.

Figure 2:
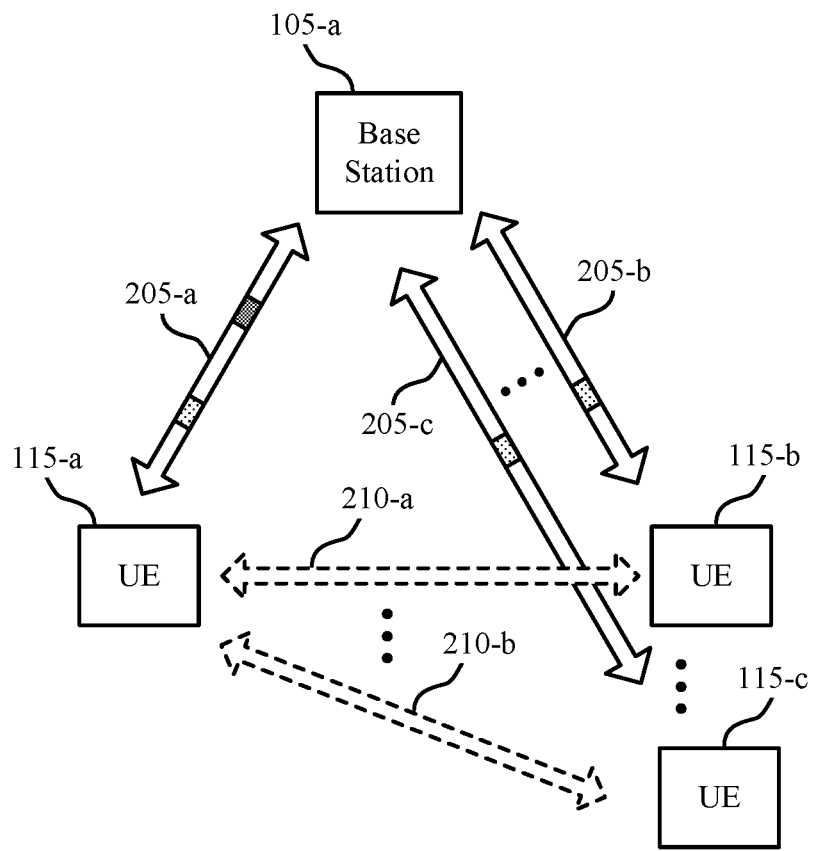
FIG. 2 illustrates an example of a portion of a wireless communications system that supports sidelink groupcast beam training in accordance with one or more aspects of the present disclosure.
Figure 2:
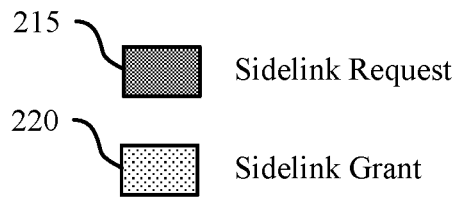

FIG. 2 illustrates an example of a wireless communications system 200 that supports sidelink groupcast beam training in accordance with one or more aspects of the present disclosure. In some examples, wireless communications system 200 may implement aspects of wireless communications system 100. In some examples, the wireless communications system 200 may include a first UE 115-a, a second UE 115-b, a third UE 115-c, and base station 105-a which may be examples of UEs 115 and base stations 105 described with reference to FIG. 1. One or more of the UEs 115 may communicate with the base station 105 using a corresponding access link 205. In this example, the base station 105-a may communicate with the first UE 115-a via access link 205-a, may communicate with the second UE 115-b via access link 205-b, and may communicate with the third UE 115-c via access link 205-c.

In this example, the first UE 115-a, second UE 115-b, and third UE 115-c may be members of a sidelink groupcast communications group, in which members of the group may communicate with other members of the group to provide data or other information via sidelinks 210. For example, the first UE 115-a may communicate with the second UE 115-b via sidelink 210-a, and the first UE 115-a may communicate with the third UE 115-c via sidelink 210-b. In some cases, an applications layer at the first UE 115-a may prompt the creation of the sidelink groupcast communications group, and the group may be established through communications with the applications layer of other UEs 115 in the group. It is noted that the illustrated sidelink groupcast communications group provide communications between three UEs 115, which are illustrated in wireless communications system 200 for the sake of brevity, and the techniques described herein may be applicable to other numbers of UEs 115 within a system that may establish a groupcast communications group. Further, sidelink communication techniques may be used for device-to-device communication of wireless devices other than UEs, such as base station communications (e.g., wireless backhaul links between base stations or transmit-receive points (TRPs)), communications between access points, and the like.

In some cases, such as platooning where a group of vehicles travel together in a convoy, an application layer protocol (e.g., a V2X application layer) may form the sidelink groupcast communications group, and negotiation may happen between UE 115 members of the group. A group leader (e.g., first UE 115-a), such as a platoon leader in a platooning application, in some cases, may know the size of the group, and may transmit a sidelink request 215 to the base station 105-a associated with operation of the sidelink groupcast communications of the group. For example, the first UE 115-a may transmit a scheduling request, a beam training request, group configuration request, and the like, to the base station 105-a. Responsive to the sidelink request 215, the base station 105-a may transmit a sidelink grant 220 to UEs 115 of the group. The sidelink grant 220 may provide information related to sidelink groupcast communications, such as a grant of resources for sidelink transmissions, a grant of resources to be used for beam training, an indication of beams or resources for one or more hops in multi-hop communications, or any combinations thereof. In some examples, such as discussed with reference to FIGS. 3 through 5, the first UE 115-a may transmit a beam training request as the sidelink request 215 to initiate a beam training procedure for the group of UEs 115 in order to determine beams to be used in sidelink groupcast communications.

Figure 3:
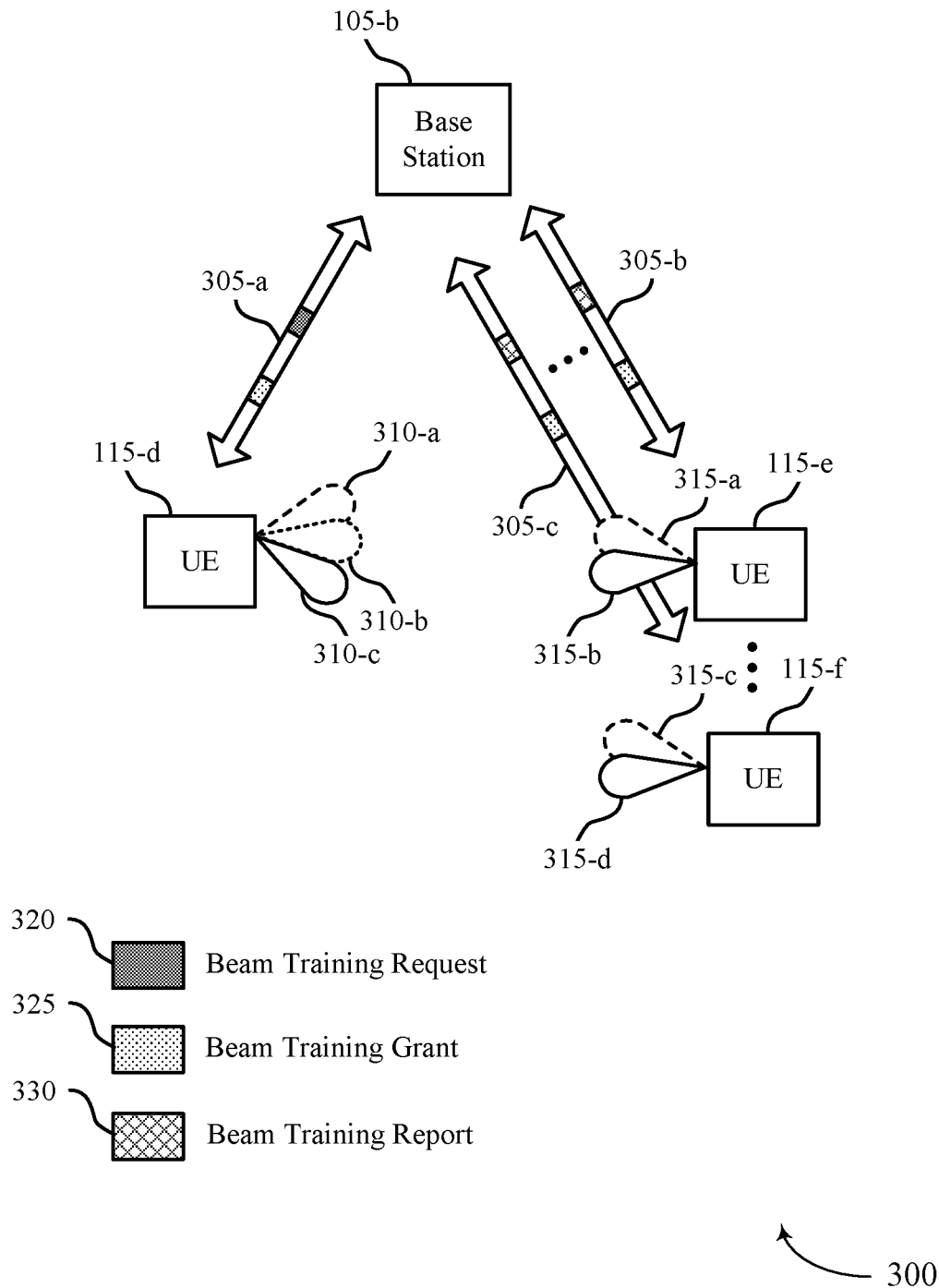
FIG. 3 illustrates another example of a portion of a wireless communications system that supports sidelink groupcast beam training in accordance with one or more aspects of the present disclosure.

FIG. 3 illustrates an example of a wireless communications system 300 that supports sidelink groupcast beam training in accordance with one or more aspects of the present disclosure. In some examples, wireless communications system 300 may implement aspects of wireless communications system 100 or 200. In some examples, the wireless communications system 300 may include a first UE 115-d, a second UE 115-e, a third UE 115-f, and base station 105-b which may be examples of UEs 115 and base stations 105 described with reference to FIG. 1 or 2. One or more of the UEs 115 may communicate with the base station 105 using a corresponding access link 305. In this example, the base station 105-b may communicate with the first UE 115-d via access link 305-a, may communicate with the second UE 115-e via access link 305-b, and may communicate with the third UE 115-f via access link 305-c.

In this example, similarly as in the example of FIG. 2, the first UE 115-d, second UE 115-e, and third UE 115-f may be members of a sidelink groupcast communications group, in which members of the group may communicate with other members of the group to provide data or other information via sidelinks. In this example, sidelink communications may be performed over transmission beams (e.g., using mmW frequencies), and the first UE 115-d may be a transmitting UE that transmits on one or more transmit beams 310. The second UE 115-e and the third UE 115-f (and any other UEs 115 in the group) may receive transmissions using receive circuitry that is configured with receive beamforming parameters that correspond to receive beams 315.

In this example, the first UE 115-d may be a transmitting UE of a sidelink groupcast communications group, and may transmit a beam training request 320 to the base station 105-b. In some cases, the first UE 115-d may indicate a number of beams it will use for beam training, other UEs 115 of the group, a sub-group of UEs 115 that are to perform the beam training (e.g., UEs that have certain capabilities or support certain services), or any combinations thereof. The base station 105-b may receive the beam training request 320, and identify wireless resources (e.g., time resources and frequency resources) that the group of UEs 115 may use to perform beam training. The base station 105-b may then transmit a beam training grant 325 to each UE 115 of the group of UEs. Based on the beam training grant 325, the first UE 115-d may transmit a number of transmit beams 310, including a first transmit beam 310-a, a second transmit beam 310-b, and a third transmit beam 310-c, using the wireless resources provided in the beam training grant 325. The second UE 115-e and the third UE 115-f (and any other UEs of the group of UEs) may measure received signals on the wireless resources to identify one or more preferred beams. In this example, the second UE 115-e may measure received signal characteristics for beamforming parameters corresponding to a first receive beam 315-a and a second receive beam 315-b, and the third UE 115-f may measure received signal characteristics for beamforming parameters corresponding to a third receive beam 315-c and a fourth receive beam 315-d. It is to be understood that the illustrated beams are provided for purposes of discussion and illustration only, and that more or fewer transmit beams 310 or receive beams 315 may be transmitted and used for measurements as part of the beam training procedure.

After measuring received signal characteristics for receive beams 315 as part of the beam training procedure, each of the second UE 115-e and the third UE 115-f may provide a beam training report 330 to the base station 105-b. In some cases, the beam training reports 330 may indicate received signal quality of measured training signals, the receive beam(s) 315 used to receive the signals and perform measurements, the resource in which the training signal was transmitted and received, or any combinations thereof. In some cases, the first UE 115-d may also transmit a beam training report to the base station 105-b, that may provide an indication that the training procedure was performed, transmit beams 310 that were used, resources associated with each transmit beam 310, beamforming parameters associated with transmit beams 310, or any combinations thereof. In some examples, the base station 105-b may transmit a beam training report grant to the first UE 115-d, the group of UEs 115 (e.g., the second UE 115-e and the third UE 115-f), or both. The beam training report grant may provide information related to a grant of resources for beam training reporting. That is, the beam training report grant may indicate resources (e.g., time/frequency resources) on which the first UE 115-d, the second UE 115-e, and the third UE 115-f may transmit the beam training report 330 to the base station.

In some cases, the base station 105-b, based on the beam training reports 330, may determine beams for use in the groupcast sidelink communications, may forward report information to the first UE 115-d to determine beams for use in the groupcast sidelink communications, or combinations thereof. In some cases, the beam training reports 330 may also be used to identify the subset of reachable UEs 115 that can receive communications from the first UE 115-d, which may be used to determine a connectivity map. Based on the beam training reports 330, the base station 105-b may provide a sidelink resource grant to the first UE 115-d and to the receiving second UE 115-e and third UE 115-f (and any other receiving UEs) for sidelink groupcast communications. In some cases, the sidelink resource grant may be provided in DCI, which may indicate one or more of which UE 115 is to transmit the sidelink communications (e.g., for use by receiving UEs 115 to determine which receive beam to use), which UEs 115 are to receive the groupcast sidelink communications, the transmit beam 310 that the transmitting UE 115 is to use, wireless resources (e.g., time/frequency resources) for the grant, or any combinations thereof.

In some cases, UEs 115 that receive sidelink groupcast communications from the first UE 115-d may transmit acknowledgment feedback (e.g., HARQ ACK/NACK feedback) to indicate whether the communication was successfully received. In some cases, the acknowledgment feedback may be transmitted to the base station 105-b (e.g., via a Uu link between each UE 115 and the base station 105-b), and the base station 105-b may forward feedback information to the first UE 115-d. In other cases, the acknowledgment feedback may be transmitted to the first UE 115-d directly. In some cases (e.g., when spatial division multiplexing (SDM) or frequency division multiplexing (FDM) are used in sidelink communications), the acknowledgment feedback may be transmitted assuming beam reciprocity from the configured transmit/receive beams. In other cases (e.g., when time division multiplexing (TDM) is used in sidelink communications), when the acknowledgment feedback is transmitted to the first UE 115-*d* directly, one or more subsequent beam training procedures may be performed in order to identify beams from the second UE 115-*e* and the third UE 115-*f* to transmit ACK/NACK feedback to the first UE 115-*d*.

Figure 4:
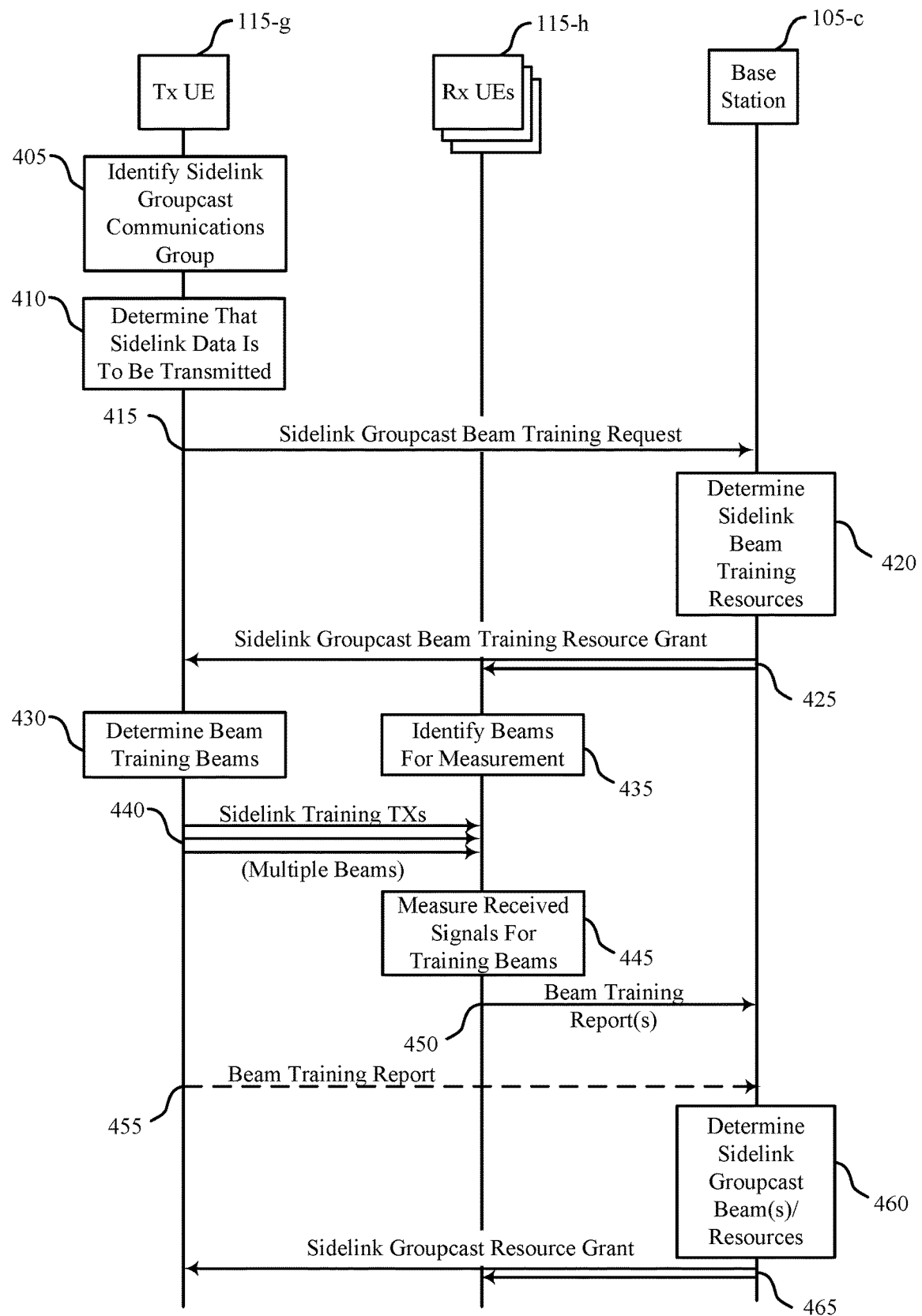
FIG. 4 illustrates an example of a process flow that supports sidelink groupcast beam training in accordance with one or more aspects of the present disclosure.

FIG. 4 illustrates an example of a process flow 400 that supports sidelink groupcast beam training in accordance with one or more aspects of the present disclosure. In some examples, process flow 400 may implement aspects of wireless communications system 100, 200, or 300. Process flow 400 may be implemented by transmitting UE 115-*g*, multiple receiving UEs 115-*h*, a serving base station 105-*c*, or any other examples of UEs 115 or base stations 105 as described herein. Alternative examples of the following may be implemented, where some steps are performed in a different order than described or are not performed at all. In some cases, steps may include additional features not mentioned below, or further steps may be added.

At 405, the transmitting UE 115-*g*, which may be an example of a first UE as discussed herein, may identify a sidelink groupcast communications group that is to receive sidelink transmissions from the transmitting UE 115-*g*. In some cases, the transmitting UE 115-*g* may be a group leader for sidelink groupcast communications (e.g., a platoon leader in V2X sidelink communications), and may identify a number of other receiving UEs 115-*h* as group members. The receiving UEs 115-*h* may be examples of a second UE that receives groupcast communications as discussed herein.

At 410, the transmitting UE 115-*g* may determine that sidelink data is to be transmitted to the receiving UEs 115-*h*. For example, the transmitting UE 115-*g* may be associated with a vehicle in V2X communications and may determine that sensor data is to be transmitted to nearby UEs that are able to perform sidelink communications. At 415, the transmitting UE 115-*g* may transmit a sidelink groupcast training request to the base station 105-*c*. The sidelink groupcast training request may include, for example, a number of beams that will be used for beam training, an indication of the receiving UEs 115-*h* of the group, a sub-group of UEs that are to perform the beam training (e.g., UEs that have certain capabilities or support certain services), or any combinations thereof.

At 420, the base station 105-*c* may determine sidelink beam training resources. The beam training resources may include time resources, frequency resources, or combinations thereof, that are to be used in a beam training procedure for the sidelink groupcast communications. In some cases, the base station 105-*c* may identify the beam training resources based on scheduling of other communications with other UEs or base stations, scheduling of other sidelink resource grants of other UEs, a priority for the requested communications of the transmitting UE 115-*g*, and the like. The base station 105-*c* may transmit, at 425, a sidelink groupcast beam training resource grant to the transmitting UE 115-*g* and to the receiving UEs 115-*h*. Thus, the base station 105-*c* may coordinate beam training for sidelink groupcast communications, and in some cases may also perform scheduling of sidelink groupcast communications.

At 430, the transmitting UE 115-*g* may determine beams for use in the beam training procedure, based on the sidelink groupcast beam training resource grant. Likewise, at 435, the receiving UEs 115-*h* may identify beams for measurement in the beam training procedure, based on the sidelink groupcast beam training resource grant. In some cases, the transmitting UE 115-*g* may identify training beams that are to be transmitted in a beam sweep procedure, and the receiving UEs 115-*h* may identify beamforming parameters that are to be applied to receive components for one or multiple receive beams that are to be measured as part of the beam training procedure. In some cases, the beam training resource grant may indicate a subset of available beams that are to be used in the beam training procedure, and the training beams may be determined based on the indicated subset of available beams.

At 440, the transmitting UE 115-*g* may transmit the multiple training beams. At 445, the receiving UEs 115-*h* may measure received signals for the training beams. In some cases, the receiving UEs 115-*h* may measure a received signal quality (e.g., a reference signal received power (RSRP)) of a training signal transmitted on the training beams. Based on the measurements, each of the receiving UEs 115-*h* may generate a beam training report, and at 450 may transmit the beam training report to the base station 105-*c*. Alternatively or additionally, each of the receiving UEs 115-*h* may generate a beam training report, transmit the beam training report to the transmitting UE 115-*g* and the transmitting UE 115-*g* may forward the beam training report to the base station 105-*c*. The beam training reports may indicate, for example, received signal quality of measured training signals, the receive beam(s) used to receive the signals and perform measurements, the resource in which the training signal was transmitted and received, or any combinations thereof. In some examples, the base station 105-*c* may transmit a beam training report grant to the transmitting UE 115-*g*, the receiving UEs 115-*h*, or both. The beam training report grant may provide information related to a grant of resources for beam training reporting. That is, the beam training report grant may indicate resources (e.g., time/frequency resources) on which the transmitting UE 115-*g*, the receiving UEs 115-*h*, or both may transmit the beam training report 330 to the base station.

Optionally, at 455, the transmitting UE 115-*g* may also transmit a beam training report to the base station 105-*c*. Such a beam training report may provide, for example, an indication that the training procedure was performed, transmit beams that were used, resources associated with each beam, beam identifications, beamforming parameters associated with beams, or any combinations thereof.

At 460, the base station 105-*c* may determine sidelink groupcast beam(s) and resources to be used for the sidelink groupcast communications. In some cases, the base station 105-*c* may determine compatible pairs of transmit and receive beams based on the training beams used at the transmitting UE 115-*g* and the measurements reported by the receiving UEs 115-*h*. Further, in some cases, the base station 105-*c* may determine one or more communications parameters for the identified beams/resources, such as a modulation and coding scheme (MCS), supported data rates, and the like.

At 465, the base station 105-*c* may transmit a sidelink groupcast resource grant to the transmitting UE 115-*g* and the receiving UEs 115-*h*. The sidelink groupcast resource grant may indicate, for example, an identification of the transmitting UE 115-*g*, identifications of the receiving UEs 115-*h*, resources to be used for the sidelink groupcast transmissions, beams to be used for the sidelink groupcast transmissions, transmission parameters for the sidelink groupcast transmissions (e.g., MCS, transmit power), or any combinations thereof. In some cases, the sidelink groupcast resource grant may be provided in a DCI message. The transmitting UE 115-*g* and receiving UEs 115-*h* may then perform sidelink groupcast communications based on the provided sidelink groupcast resource grant. In some cases, receiving UEs 115-*h* may provide acknowledgment feedback for the sidelink groupcast communications, such as discussed for some examples with reference to FIG. 5.

Figure 5:
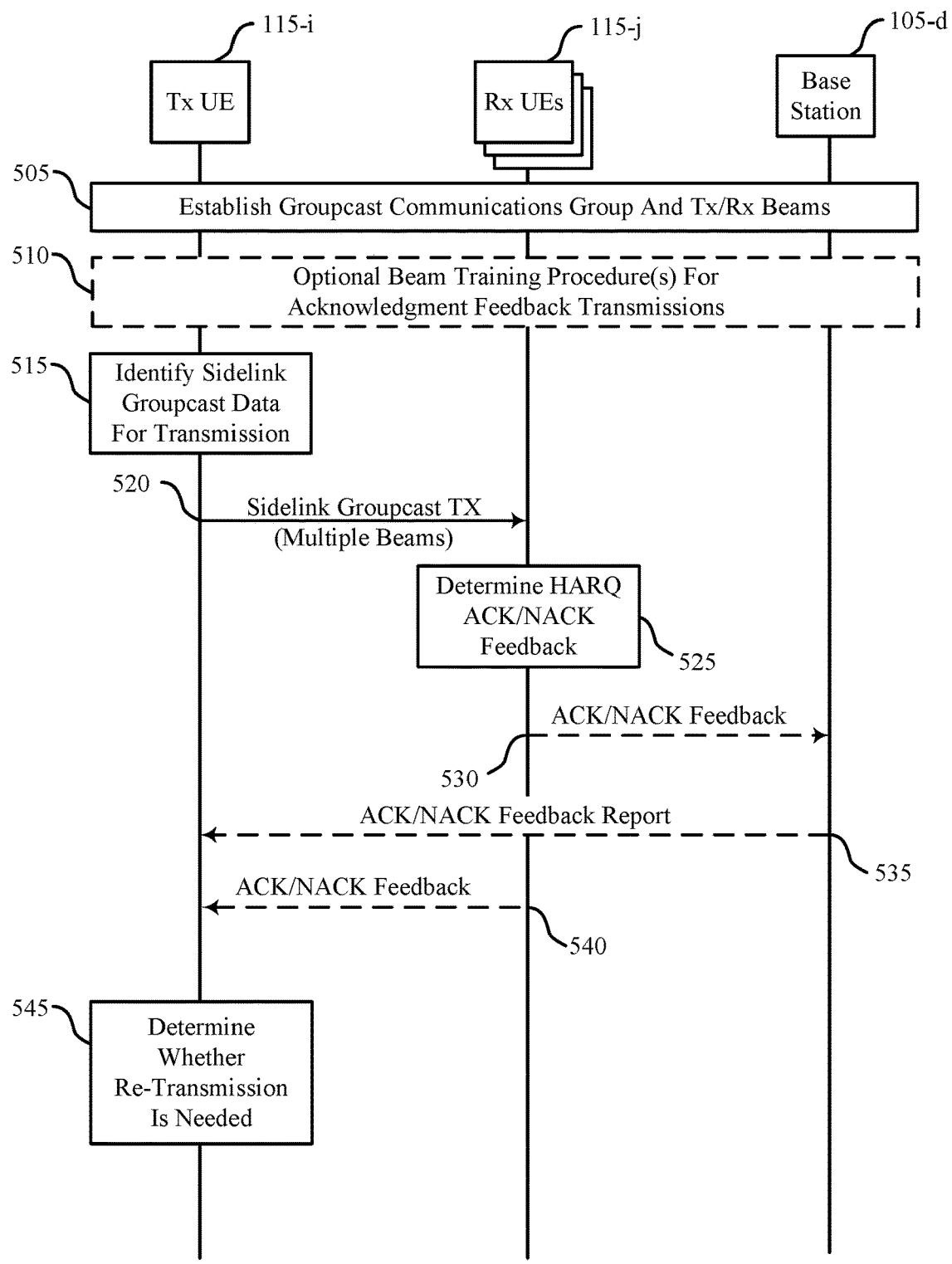
FIG. 5 illustrates an example of a process flow that supports sidelink groupcast beam training in accordance with one or more aspects of the present disclosure.

FIG. 5 illustrates an example of a process flow 500 that supports sidelink groupcast beam training in accordance with one or more aspects of the present disclosure. In some examples, process flow 500 may implement aspects of wireless communications system 100, 200, or 300. Process flow 500 may be implemented by transmitting UE 115-*i*, multiple receiving UEs 115-*j*, a serving base station 105-*d*, or any other examples of UEs 115 or base stations 105 as described herein. Alternative examples of the following may be implemented, where some steps are performed in a different order than described or are not performed at all. In some cases, steps may include additional features not mentioned below, or further steps may be added.

At 505, the transmitting UE 115-*i*, receiving UEs 115-*j*, and base station 105-*d* may establish a groupcast communications group and associated transmit/receive beams to be used at the transmitting/receiving devices. The sidelink groupcast communications group and associated transmit/receive beams may be determined as discussed herein, such as discussed with reference to FIGS. 2 through 4.

Optionally, at 510, a one or more additional beam training procedures may be performed to determine transmit/receive beams for communications from the receiving UEs 115-*j* back to the transmitting UE 115-*i*, such as acknowledgment feedback communications. In such cases, beam training resources may be granted for the receiving UEs 115-*j* to transmit training beams that are then measured at the transmitting UE 115-*i*, in order to establish beam pair links for acknowledgment feedback transmissions.

At 515, the transmitting UE 115-*i* may identify sidelink groupcast data that is to be transmitted to the receiving UEs 115-*j*. For example, the transmitting UE 115-*i* may be associated with a vehicle in V2X communications and may determine that sensor data is to be transmitted to the receiving UEs 115-*j*.

At 520, the transmitting UE 115-*i* may transmit a sidelink groupcast transmission to the receiving UEs 115-*j*. In some cases, the sidelink groupcast transmission may be made using multiple transmission beams, in order to provide reliable communications to multiple receiving UEs 115-*j* that may be located in different directions from the transmitting UE 115-*i*. At 525, each of the receiving UEs 115-*j* may determine acknowledgment feedback (e.g., HARQ ACK/NACK feedback) for the sidelink groupcast transmission.

In various aspects, the acknowledgment feedback may be reported using different reporting techniques. In some cases, as indicated at 530, the receiving UEs 115-*j* may transmit acknowledgment feedback to the base station 105-*d* (e.g., using an established Uu interface with the base station 105-*d*). In such cases, as indicated at 535, the base station 105-*j* may aggregate the acknowledgment feedback from multiple receiving UEs 115-*j* and transmit an acknowledgment feedback report to the transmitting UE 115-*i*. In some cases, the base station 105-*d* may determine if resources are needed for a retransmission, and may provide a retransmission grant that is associated with the feedback report, in which cases the retransmission grant may be provided to both the transmitting UE 115-*i* and the receiving UEs 115-*j*. In other cases, the receiving UEs 115-*j* may transmit acknowledgment feedback directly to the transmitting UE 115-*i*, as indicated at 540 (e.g., using a beam that was determined by the optional beam training procedure at 510).

At 545, the transmitting UE 115-*i* may determine whether retransmission of the sidelink groupcast communication is needed. In some cases, if any of the receiving UEs 115-*j* report a NACK, a retransmission may be triggered. In other cases, retransmissions may be triggered based on certain retransmission criteria, such as a number of receiving UEs 115-*j* that did not receive the sidelink groupcast transmission being above a threshold value, a priority associated with the sidelink groupcast transmission, a time sensitivity of the data in the sidelink groupcast transmission (e.g., sensor data that is no longer valid after a certain time period), one or more other criteria, or any combinations thereof. In some cases, the transmitting UE 115-*i* may initiate any required retransmissions by transmitting a request to the base station 105-*d*, which may then schedule the retransmission at the transmitting UE 115-*i* and the receiving UEs 115-*j*.

Figure 6:
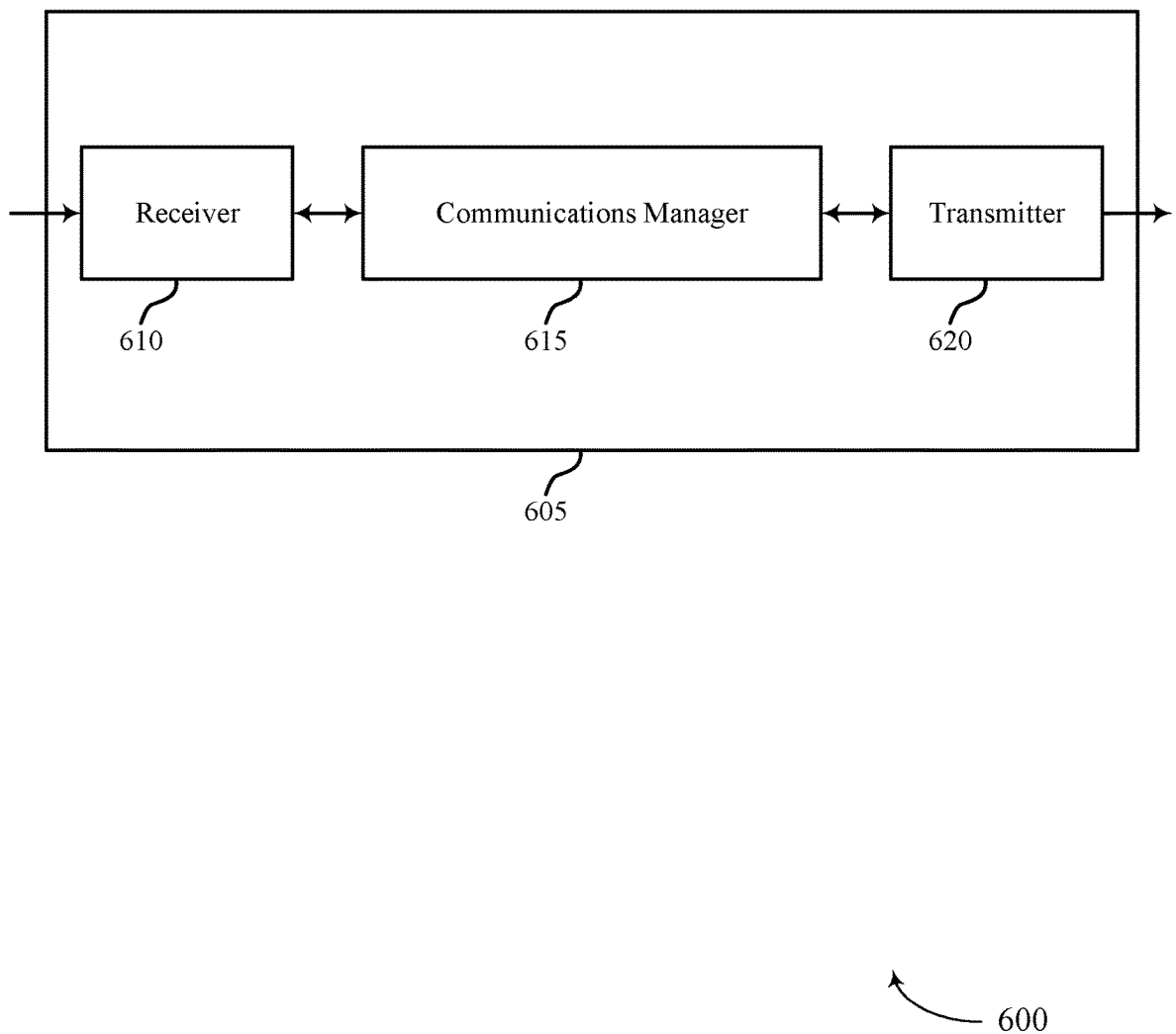
FIGS. 6 and 7 show block diagrams of devices that support sidelink groupcast beam training in accordance with one or more aspects of the present disclosure.

FIG. 6 shows a block diagram 600 of a device 605 that supports sidelink groupcast beam training in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sidelink groupcast beam training). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, to a base station, a sidelink beam training request for groupcast sidelink communications with a set of other UEs, receive, from the base station, a beam training grant that indicates resources for beam training between the first UE and the set of other UEs, perform a beam training procedure based on the beam training grant, and transmit a beam training report to the base station. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 615 may be an example of means for performing various aspects of beam training techniques as described herein. The communications manager 615, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a DSP, an ASIC, an FPGA or other programmable logic device.

In some examples, the communications manager 615 may be configured to perform various operations (e.g., receiving, determining, performing, transmitting) using or otherwise in cooperation with the receiver 610, the transmitter 620, or both.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to provide assistance for beam training between the device 605, one or more other wireless devices, a base station, or any combination thereof. Based on the techniques for beam training, the device 605 may perform beam training more accurately for sidelink communications (e.g., sidelink groupcast communications).

As such, the device 605 may increase the likelihood of selecting and utilizing one or more beams for sidelink communications including sidelink groupcast communications and, accordingly, may communicate over the channel with a greater likelihood of successful communications. In some examples, based on a greater likelihood of successful communications, the device 605 may more efficiently power a processor or one or more processing units associated with beam training and transmitting and receiving communications, which may enable the device 605 to save power and increase battery life.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
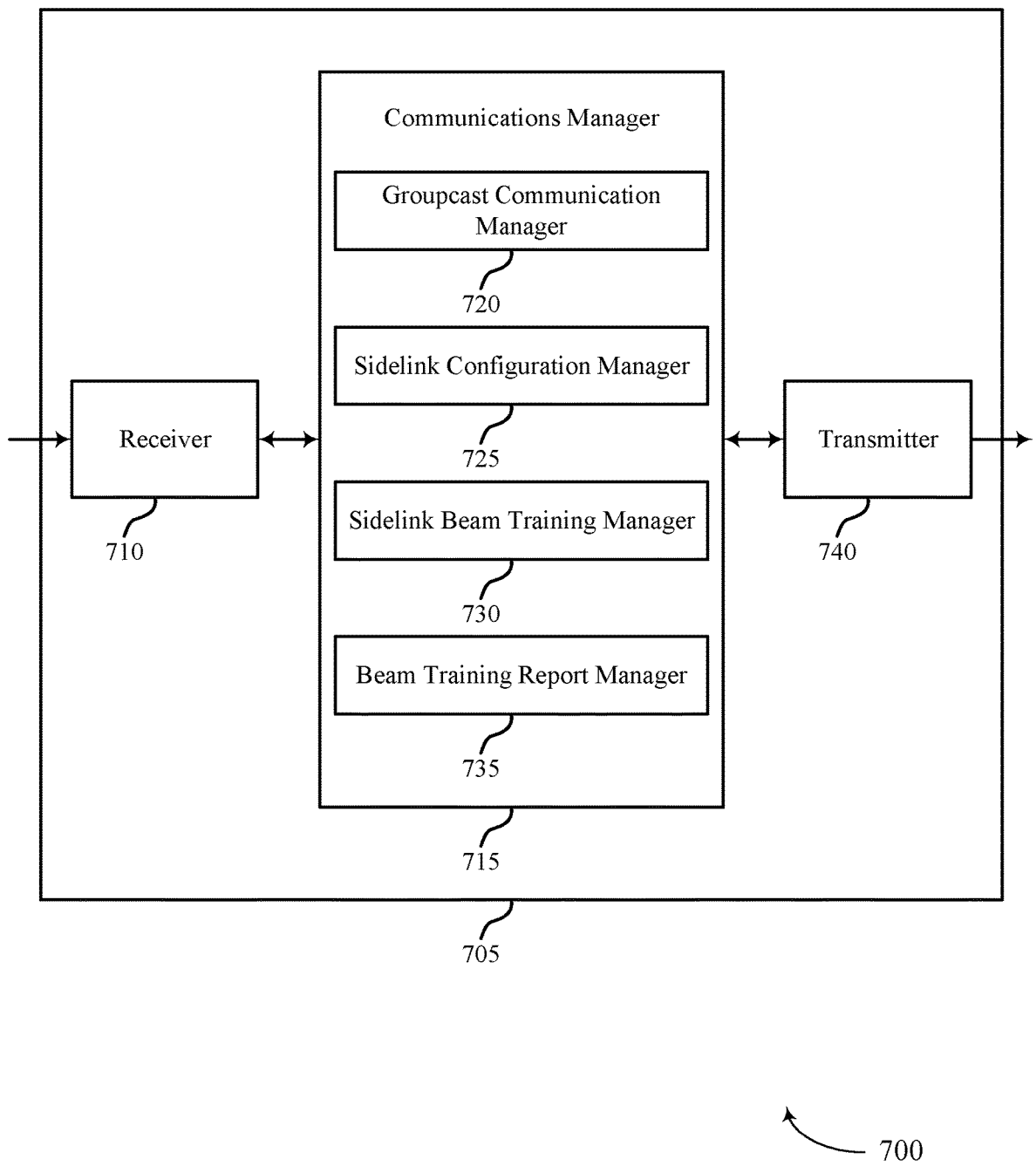

FIG. 7 shows a block diagram 700 of a device 705 that supports sidelink groupcast beam training in accordance with one or more aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to sidelink groupcast beam training, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 15 may include a groupcast communication manager 720, a sidelink configuration manager 725, a sidelink beam training manager 730, and a beam training report manager 735. The communications manager 715 may be an example of aspects of the communications manager 910 described herein.

The groupcast communication manager 720 may transmit, to a base station, a sidelink beam training request for groupcast sidelink communications with a set of other UEs. The sidelink configuration manager 725 may receive, from the base station, a beam training grant that indicates resources for beam training between the first UE and the set of other UEs. The sidelink beam training manager 730 may perform a beam training procedure based on the beam training grant. The beam training report manager 735 may transmit a beam training report to the base station.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
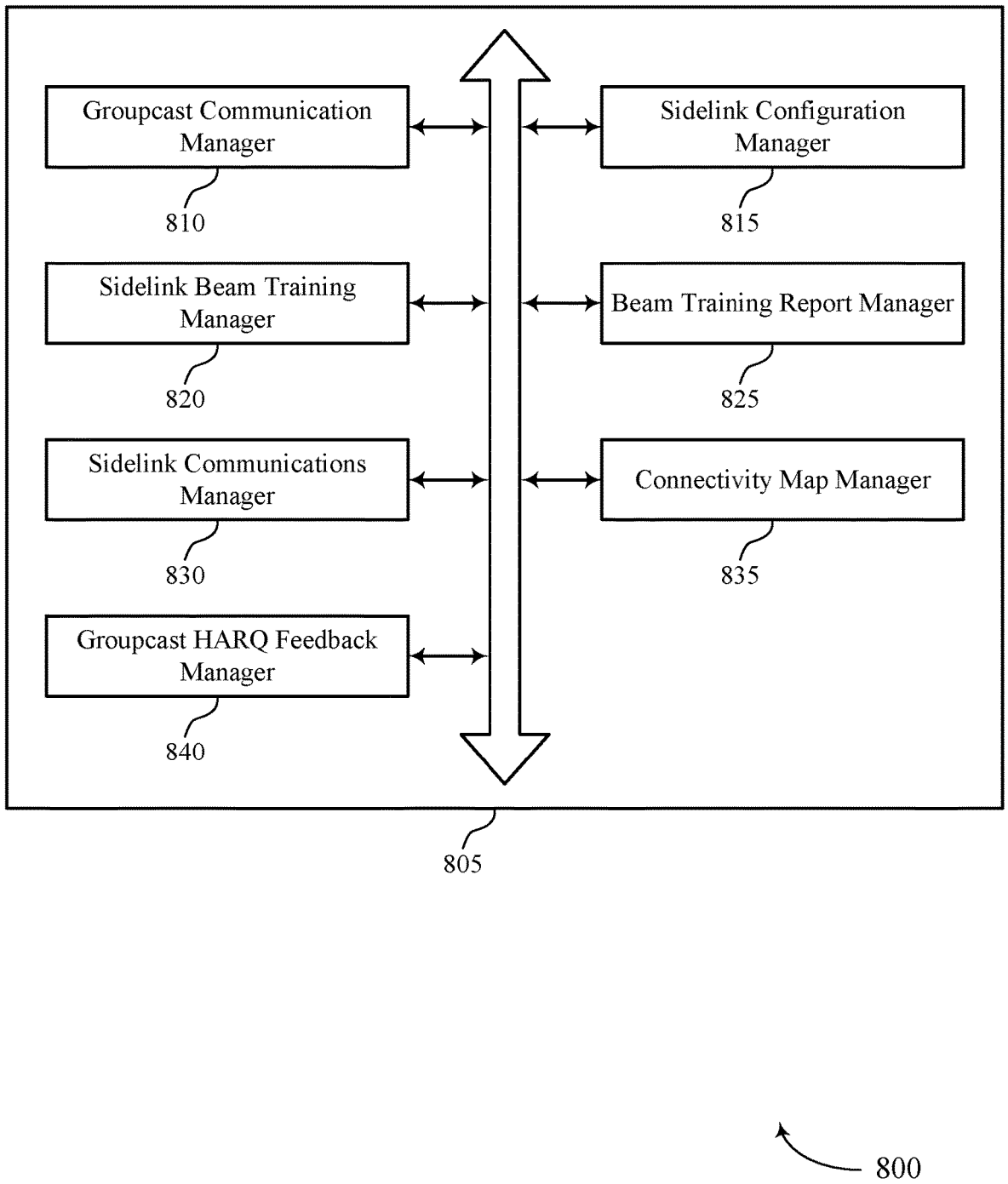
FIG. 8 shows a block diagram of a communications manager that supports sidelink groupcast beam training in accordance with one or more aspects of the present disclosure.

FIG. 8 shows a block diagram 800 of a communications manager 805 that supports sidelink groupcast beam training in accordance with one or more aspects of the present disclosure. The communications manager 805 may be an example of aspects of a communications manager 615, a communications manager 715, or a communications manager 910 described herein. The communications manager 805 may include a groupcast communication manager 810, a sidelink configuration manager 815, a sidelink beam training manager 820, a beam training report manager 825, a sidelink communications manager 830, a connectivity map manager 835, and a groupcast HARQ feedback manager 840. Each of these modules may communicate, directly or indirectly, with one another (e.g., via one or more buses).

The groupcast communication manager 810 may transmit, to a base station, a sidelink beam training request for groupcast sidelink communications with a set of other UEs. In some cases, the sidelink beam training request indicates a requested number of beams for transmitting beam training signals. In some cases, the sidelink beam training request indicates a preference for transmitting to a sub-group of UEs that are capable of groupcast sidelink communications.

In some examples, the groupcast communication manager 810 may transmit one or more groupcast sidelink transmissions to the set of other UEs (e.g., based on a grant received in DCI from a serving base station). In some cases, the DCI message may indicate one or more of an identification of a groupcast transmitting UE for the groupcast sidelink communications, a list of at least one other UE that is to receive the groupcast sidelink communications, a transmission beam that is to be used by the groupcast transmitting UE, the sidelink resources for the groupcast sidelink communications, or any combinations thereof.

The sidelink configuration manager 815 may receive, from the base station, a beam training grant that indicates resources for beam training between the first UE and the set of UEs. In some examples, the sidelink configuration manager 815 may receive, from the base station, a sidelink groupcast communications grant for transmission of a sidelink groupcast communication to the set of other UEs, and where the set of other UEs are in the sub-group of UEs.

The sidelink beam training manager 820 may perform a beam training procedure based on the beam training grant. In some examples, the sidelink beam training manager 820 may transmit a training signal on each of two or more transmission beams for measurement by the set of other UEs.

The beam training report manager 825 may transmit a beam training report to the base station, a second UE of the set of UEs, or both. In some cases, the beam training report indicates one or more of a resource in which a training signal was transmitted, identifications of one or more training beams, a resource associated with the one or more training beams, or any combinations thereof. In some cases, the beam training report manager 825 may be associated with a UE that receives one or more training beams (e.g., subsequent to an occasion where the UE was a transmitting UE of sidelink groupcast communications, or as part of a beam training procedure for acknowledgment feedback communications), in which cases the beam training report may provide a received signal quality of a training signal received, beams used to receive the training signal, a resource in which the training signal was received, or any combinations thereof. In some cases, the beam training report indicates a subset of the set of other UEs that are reachable by the first UE. In some cases, the beam training report manager 825 may receive, from the base station, a beam training report grant that indicates resources for communicating the beam training report.

The sidelink communications manager 830 may receive, responsive to the beam training report, a sidelink grant from the base station that indicates sidelink resources for groupcast sidelink communications with the set of other UEs. In some cases, the sidelink grant is received in a DCI message from the base station.

The connectivity map manager 835 may identify UEs that are reachable by other UEs using sidelink communications. In some cases, a connectivity map can be deduced from the beam training reports.

The groupcast HARQ feedback manager 840 may receive acknowledgement feedback that indicates whether the one or more groupcast sidelink transmissions were successfully received at the set of other UEs. In some examples, the groupcast HARQ feedback manager 840 may perform a second beam training procedure with the set of other UEs to establish the sidelink connection for acknowledgement feedback. In some cases, the acknowledgement feedback is received from the base station, and where each of the set of other UEs transmits associated acknowledgment feedback to the base station. In some cases, the acknowledgement feedback is received from each of the set of other UEs via a sidelink connection with the first UE.

Figure 9:
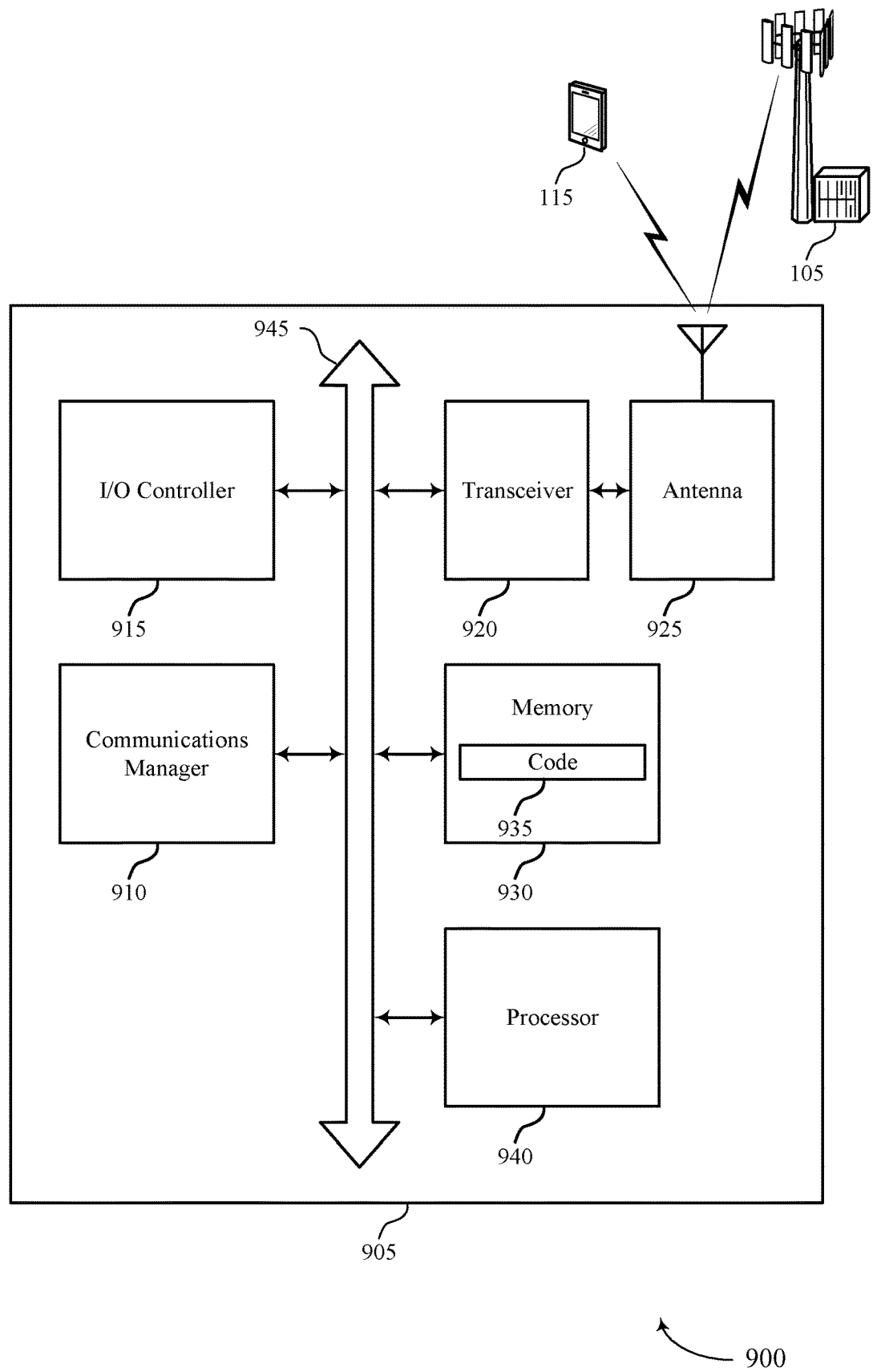
FIG. 9 shows a diagram of a system including a device that supports sidelink groupcast beam training in accordance with one or more aspects of the present disclosure.

FIG. 9 shows a diagram of a system 900 including a device 905 that supports sidelink groupcast beam training in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, to a base station, a sidelink beam training request for groupcast sidelink communications with a set of other UEs, receive, from the base station, a beam training grant that indicates resources for beam training between the first UE and the set of other UEs, perform a beam training procedure based on the beam training grant, and transmit a beam training report to the base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or in some cases, the device 905 may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink groupcast beam training).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
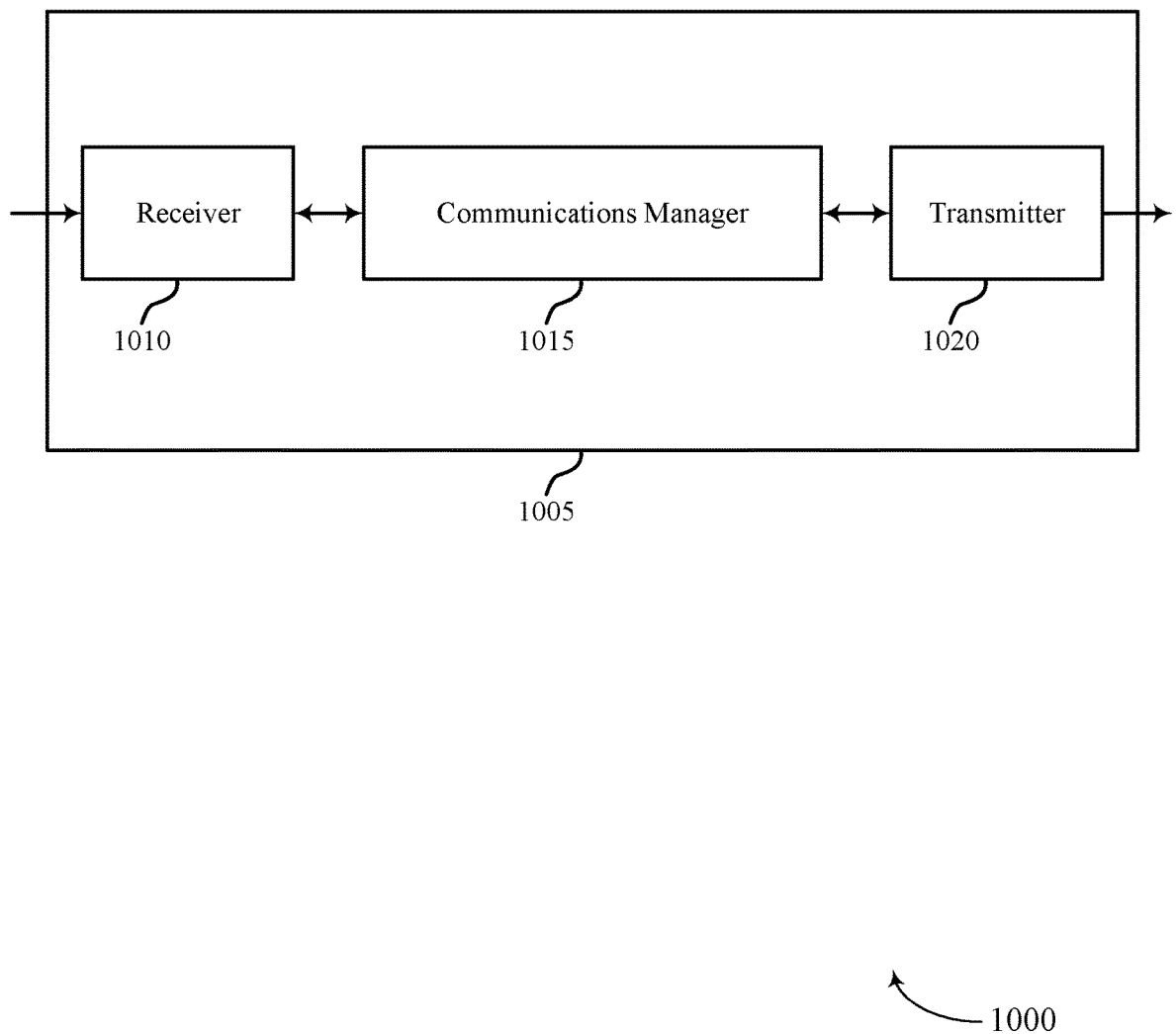
FIGS. 10 and 11 show block diagrams of devices that support sidelink groupcast beam training in accordance with one or more aspects of the present disclosure.

FIG. 10 shows a block diagram 1000 of a device 1005 that supports sidelink groupcast beam training in accordance with one or more aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink groupcast beam training, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a first UE, a sidelink beam training request for groupcast sidelink communications between the first UE and a set of other UEs, transmit, responsive to the sidelink beam training request, a beam training grant to each of the first UE and the set of other UEs that indicates resources for beam training between the first UE and the set of other UEs, and receive a beam training report from the first UE, the set of other UEs, or both that indicates sidelink beam measurements associated with the beam training grant. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The communications manager 1015 may be an example of means for performing various aspects of beam training techniques as described herein. The communications manager 1015, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 1015, or its sub-components, may be implemented in code (e.g., as communications management software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device.

In some examples, the communications manager 1015 may be configured to perform various operations (e.g., receiving, determining, performing, transmitting) using or otherwise in cooperation with the receiver 1010, the transmitter 1020, or both.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
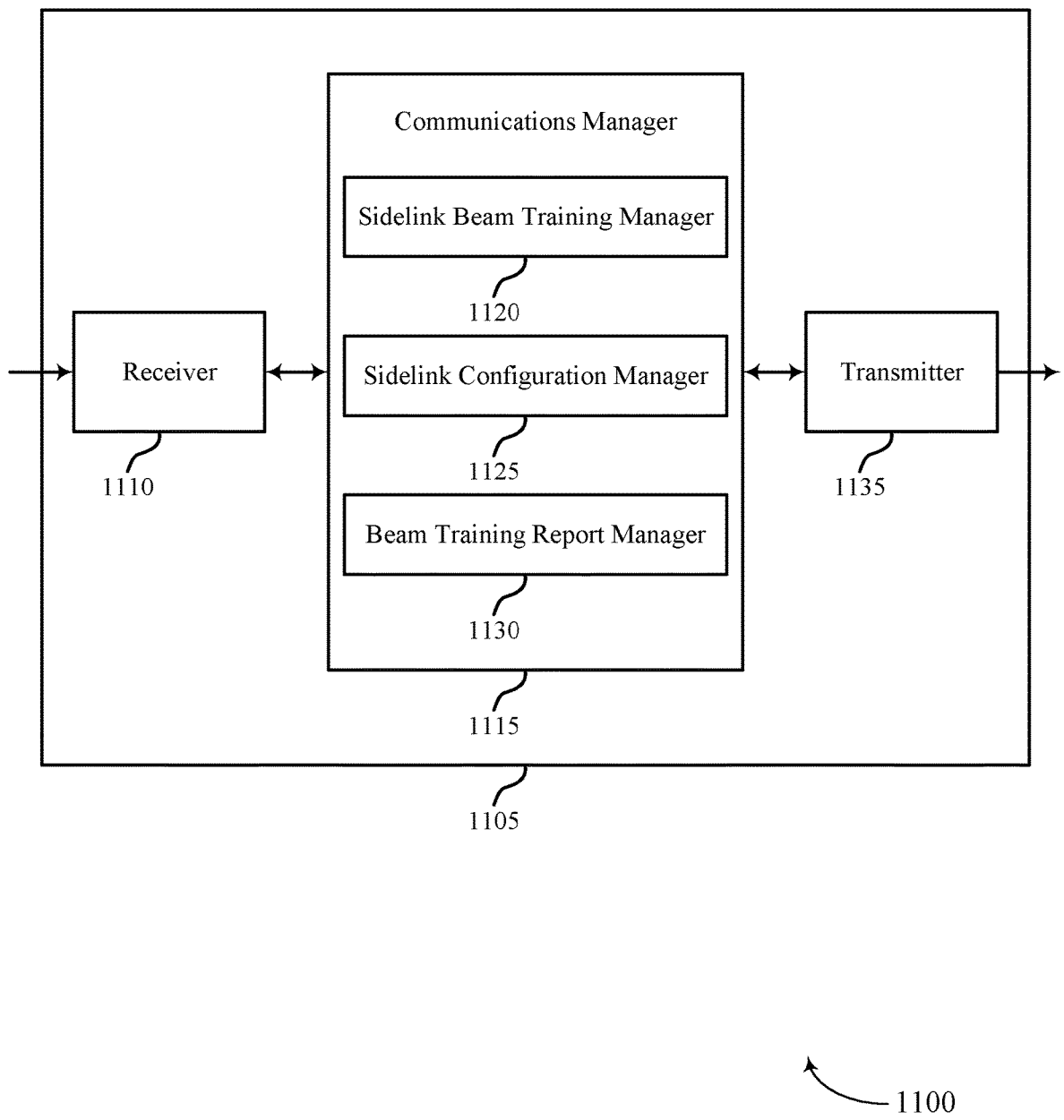

FIG. 11 shows a block diagram 1100 of a device 1105 that supports sidelink groupcast beam training in accordance with one or more aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to sidelink groupcast beam training, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a sidelink beam training manager 1120, a sidelink configuration manager 1125, and a beam training report manager 1130. The communications manager 1115 may be an example of aspects of the communications manager 1310 described herein.

The sidelink beam training manager 1120 may receive, from a first UE, a sidelink beam training request for groupcast sidelink communications between the first UE and a set of other UEs. The sidelink configuration manager 1125 may transmit, responsive to the sidelink beam training request, a beam training grant to each of the first UE and the set of other UEs that indicates resources for beam training between the first UE and the set of other UEs. The beam training report manager 1130 may receive a beam training report from the first UE, the set of other UEs, or both that indicates sidelink beam measurements associated with the beam training grant.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
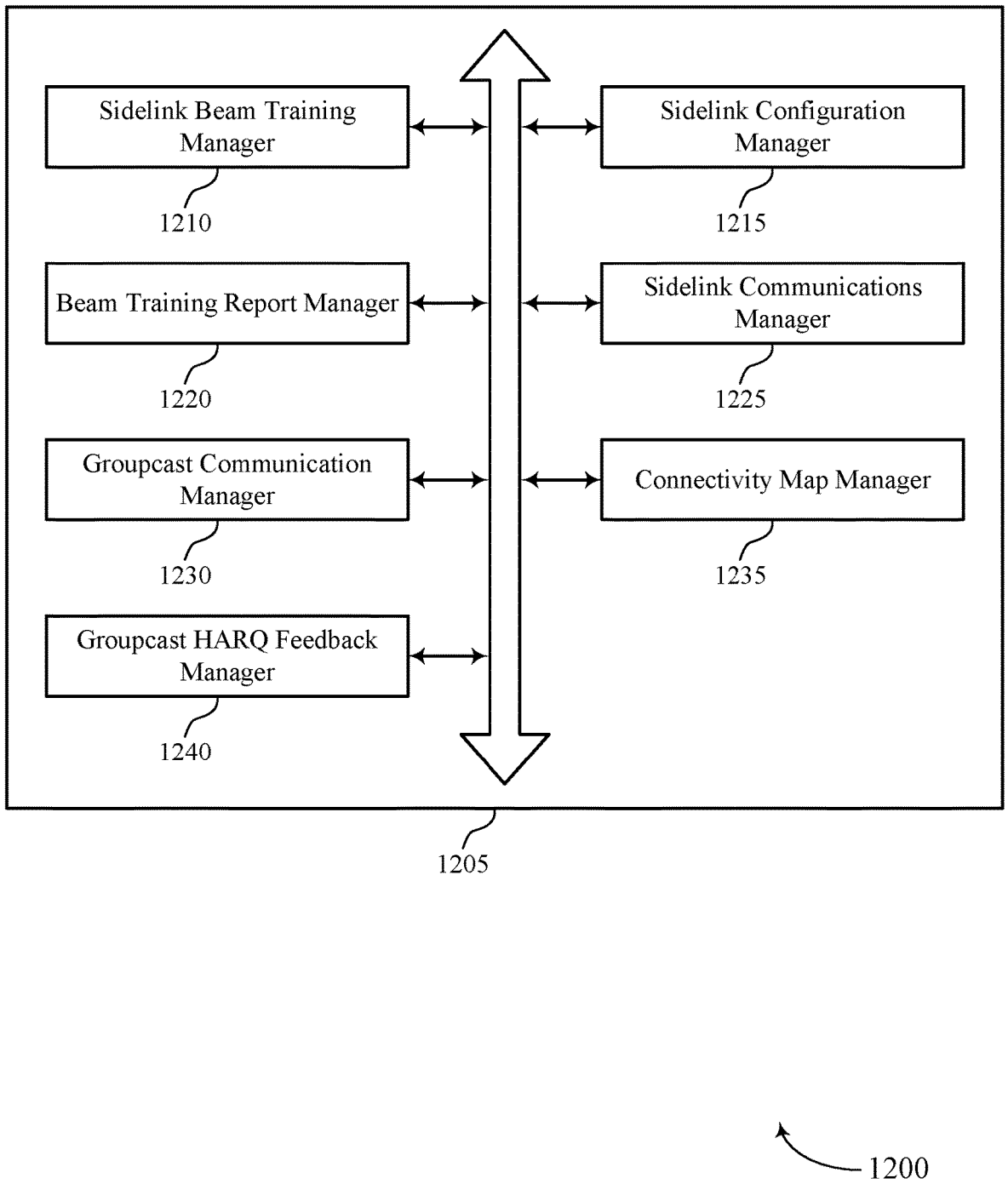
FIG. 12 shows a block diagram of a communications manager that supports sidelink groupcast beam training in accordance with one or more aspects of the present disclosure.

FIG. 12 shows a block diagram 1200 of a communications manager 1205 that supports sidelink groupcast beam training in accordance with one or more aspects of the present disclosure. The communications manager 1205 may be an example of aspects of a communications manager 1015, a communications manager 1115, or a communications manager 1310 described herein. The communications manager 1205 may include a sidelink beam training manager 1210, a sidelink configuration manager 1215, a beam training report manager 1220, a sidelink communications manager 1225, a groupcast communication manager 1230, a connectivity map manager 1235, and a groupcast HARQ feedback manager 1240. Each of these modules may communicate, directly or indirectly, with one another (e.g., via one or more buses).

The sidelink beam training manager 1210 may receive, from a first UE, a sidelink beam training request for groupcast sidelink communications between the first UE and the set of other UEs.

The sidelink configuration manager 1215 may transmit, responsive to the sidelink beam training request, a beam training grant to each of the first UE and the set of other UEs that indicates resources for beam training between the first UE and the set of other UEs.

The beam training report manager 1220 may receive a beam training report from first UE, the set of other UEs, or both that indicates sidelink beam measurements associated with the beam training grant. In some cases, the beam training report manager 1220 may transmit a beam training report grant to the first UE, the set of other UEs, or both that indicates resources for communicating the beam training report.

In some cases, the beam training report indicates one or more of a resource in which a training signal was transmitted, identifications of one or more training beams, a received signal quality of a training signal received, beams used to receive the training signal, a resource in which the training signal was received, or any combinations thereof. In some cases, the beam training report from each UE indicates a subset of the set of other UEs that are reachable by the UE.

The sidelink communications manager 1225 may transmit, responsive to the beam training report, a sidelink grant to the first UE and the set of other UEs that indicates sidelink resources for groupcast sidelink communications. In some cases, the sidelink grant is transmitted in a DCI message.

The groupcast communication manager 1230 may transmit a sidelink groupcast communications grant for sidelink groupcast communications between the first UE and the set of other UEs based on the beam training report. In some cases, the sidelink groupcast communications grant is provided in DCI that indicates one or more of an identification of a groupcast transmitting UE for the groupcast sidelink communications, a list of at least one other UE that is to receive the groupcast sidelink communications, a transmission beam that is to be used by the groupcast transmitting UE, the sidelink resources for the groupcast sidelink communications, or any combinations thereof.

In some cases, the sidelink beam training request indicates a requested number of beams for transmitting beam training signals, and where the beam training grant is determined based on the requested number of beams. In some cases, the sidelink beam training request indicates a preference for transmitting to a sub-group of UEs that are capable of groupcast sidelink communications, and where the beam training grant is determined based on the preference.

The connectivity map manager 1235 may determine a UE connectivity map based on the beam training report from each UE.

The groupcast HARQ feedback manager 1240 may receive acknowledgement feedback from the set of other UEs that indicates whether one or more groupcast sidelink transmissions were successfully received from the first UE. In some examples, the groupcast HARQ feedback manager 1240 may transmit an indication to the first UE that includes the acknowledgement feedback.

In some examples, the groupcast HARQ feedback manager 1240 may receive a request for a second beam training procedure for the set of other UEs to establish a sidelink connection with the first UE for transmitting acknowledgement feedback directly to the first UE. In some examples, the groupcast HARQ feedback manager 1240 may transmit a second beam training grant to each of the first UE and the set of other UEs responsive to the request for the second beam training procedure.

Figure 13:
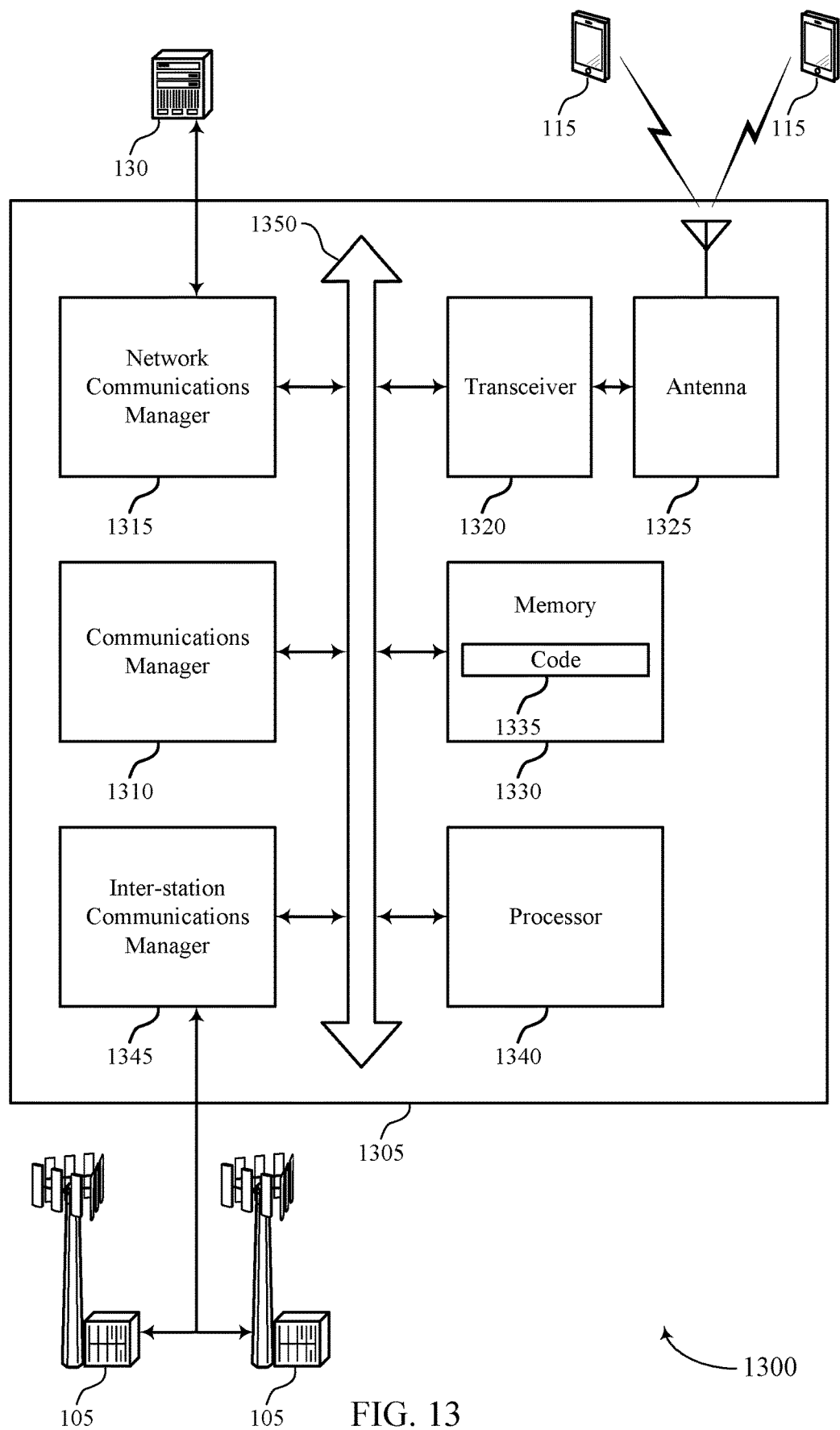
FIG. 13 shows a diagram of a system including a device that supports sidelink groupcast beam training in accordance with one or more aspects of the present disclosure.

FIG. 13 shows a diagram of a system 1300 including a device 1305 that supports sidelink groupcast beam training in accordance with one or more aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a first UE, a sidelink beam training request for groupcast sidelink communications between the first UE and the set of other UEs, transmit, responsive to the sidelink beam training request, a beam training grant to each of the first UE and the set of other UEs that indicates resources for beam training between the first UE and the set of other UEs, and receive a beam training report from the first UE, the set of other UEs, or both that indicates sidelink beam measurements associated with the beam training grant.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the device 1305 may include a single antenna 1325, or the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting sidelink groupcast beam training).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
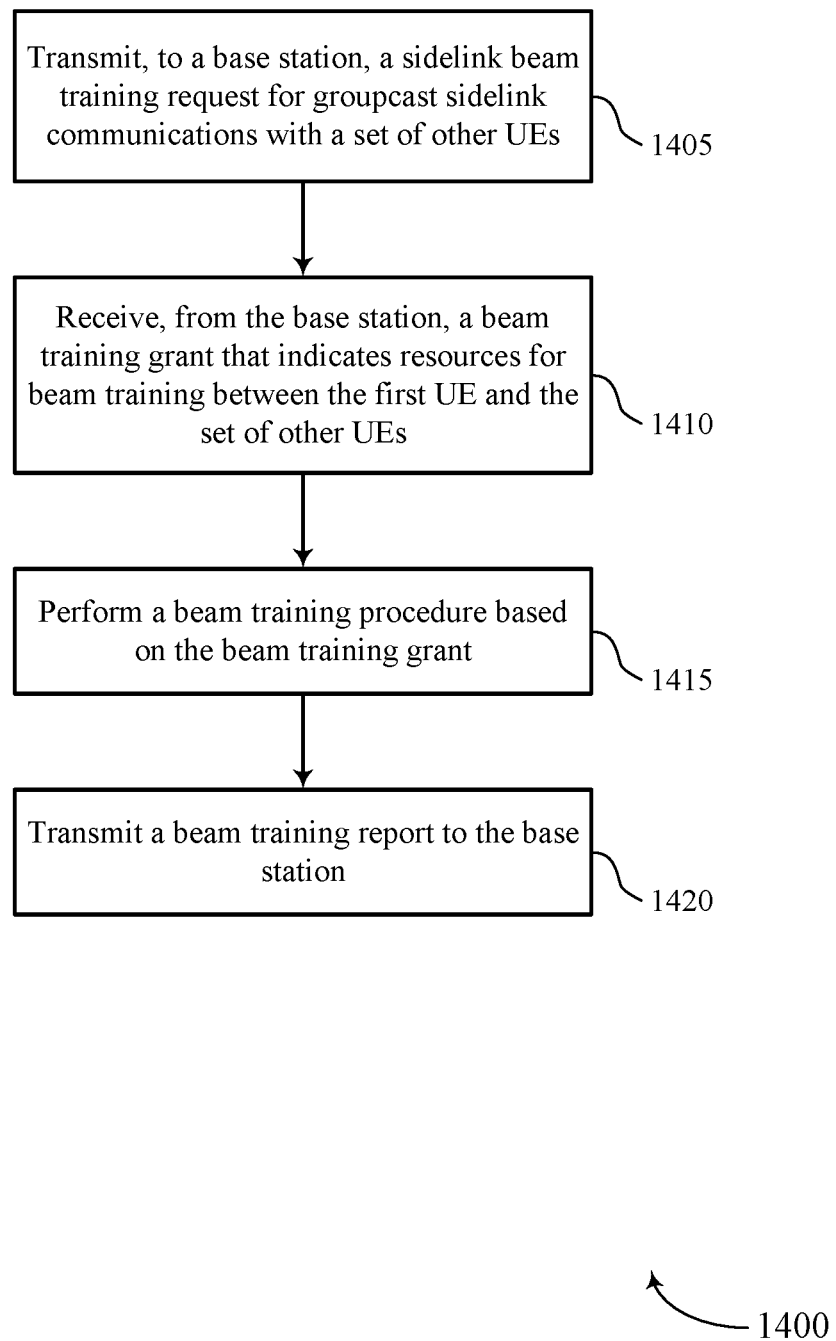
FIGS. 14 through 21 show flowcharts illustrating methods that support sidelink groupcast beam training in accordance with one or more aspects of the present disclosure.

FIG. 14 shows a flowchart illustrating a method 1400 that supports sidelink groupcast beam training in accordance with one or more aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may transmit, to a base station, a sidelink beam training request for groupcast sidelink communications with a set of other UEs. The operations of 1405 may be performed according to the methods described herein. In some examples, aspects of the operations of 1405 may be performed by a groupcast communication manager as described with reference to FIGS. 6 through 9.

At 1410, the UE may receive, from the base station, a beam training grant that indicates resources for beam training between the first UE and the set of other UEs. The operations of 1410 may be performed according to the methods described herein. In some examples, aspects of the operations of 1410 may be performed by a sidelink configuration manager as described with reference to FIGS. 6 through 9.

At 1415, the UE may perform a beam training procedure based on the beam training grant. The operations of 1415 may be performed according to the methods described herein. In some examples, aspects of the operations of 1415 may be performed by a sidelink beam training manager as described with reference to FIGS. 6 through 9.

At 1420, the UE may transmit a beam training report to the base station. The operations of 1420 may be performed according to the methods described herein. In some examples, aspects of the operations of 1420 may be performed by a beam training report manager as described with reference to FIGS. 6 through 9.

Figure 15:
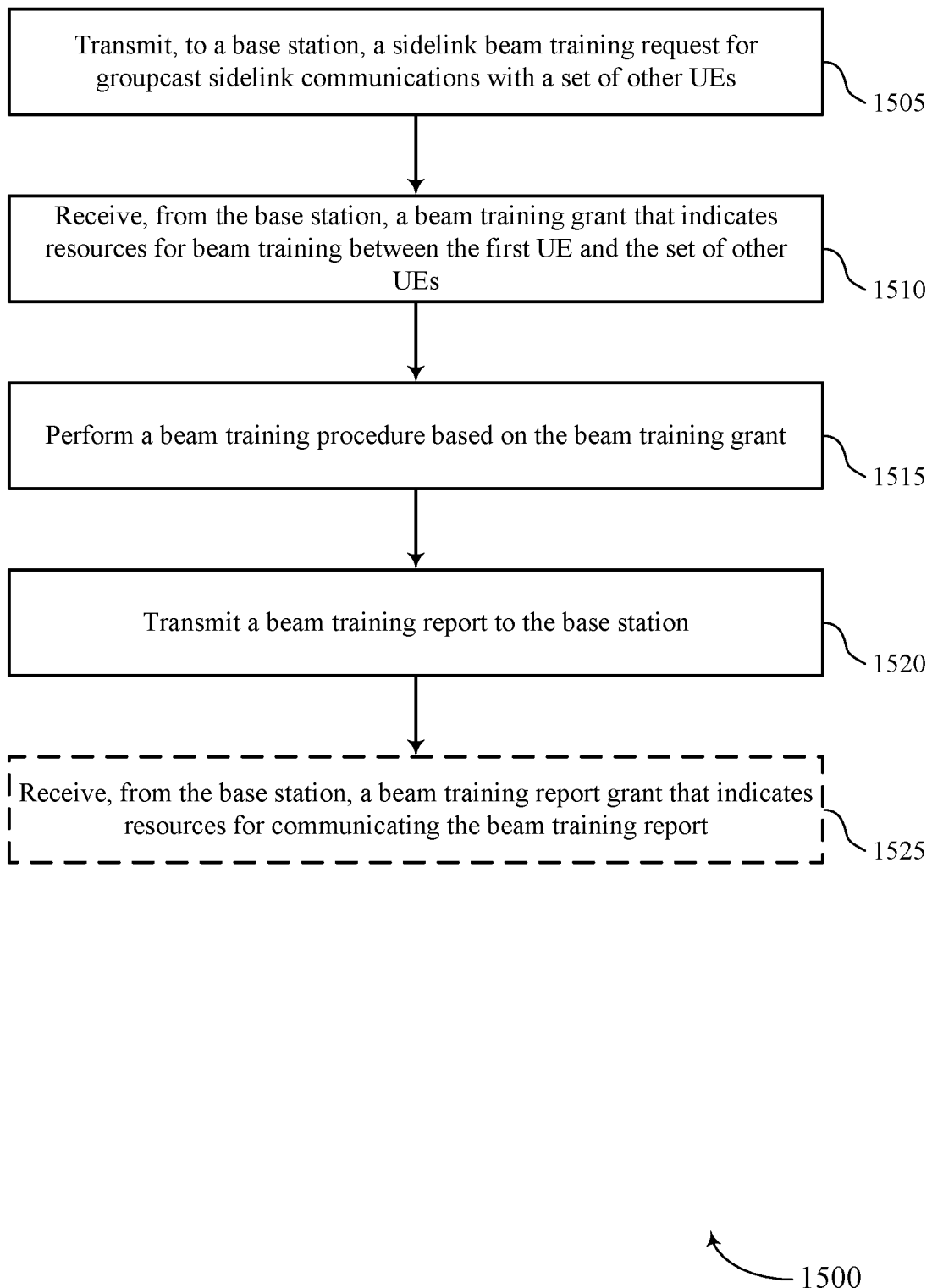

FIG. 15 shows a flowchart illustrating a method 1500 that supports sidelink groupcast beam training in accordance with one or more aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may transmit, to a base station, a sidelink beam training request for groupcast sidelink communications with a set of other UEs. The operations of 1505 may be performed according to the methods described herein. In some examples, aspects of the operations of 1505 may be performed by a groupcast communication manager as described with reference to FIGS. 6 through 9.

At 1510, the UE may receive, from the base station, a beam training grant that indicates resources for beam training between the first UE and the set of other UEs. The operations of 1510 may be performed according to the methods described herein. In some examples, aspects of the operations of 1510 may be performed by a sidelink configuration manager as described with reference to FIGS. 6 through 9.

At 1515, the UE may perform a beam training procedure based on the beam training grant. The operations of 1515 may be performed according to the methods described herein. In some examples, aspects of the operations of 1515 may be performed by a sidelink beam training manager as described with reference to FIGS. 6 through 9.

At 1520, the UE may transmit a beam training report to the base station. The operations of 1520 may be performed according to the methods described herein. In some examples, aspects of the operations of 1520 may be performed by a beam training report manager as described with reference to FIGS. 6 through 9.

At 1525, the UE may receive, from the base station, a beam training report grant that indicates resources for communicating the beam training report. The operations of 1525 may be performed according to the methods described herein. In some examples, aspects of the operations of 1525 may be performed by a sidelink communications manager as described with reference to FIGS. 6 through 9.

Figure 16:
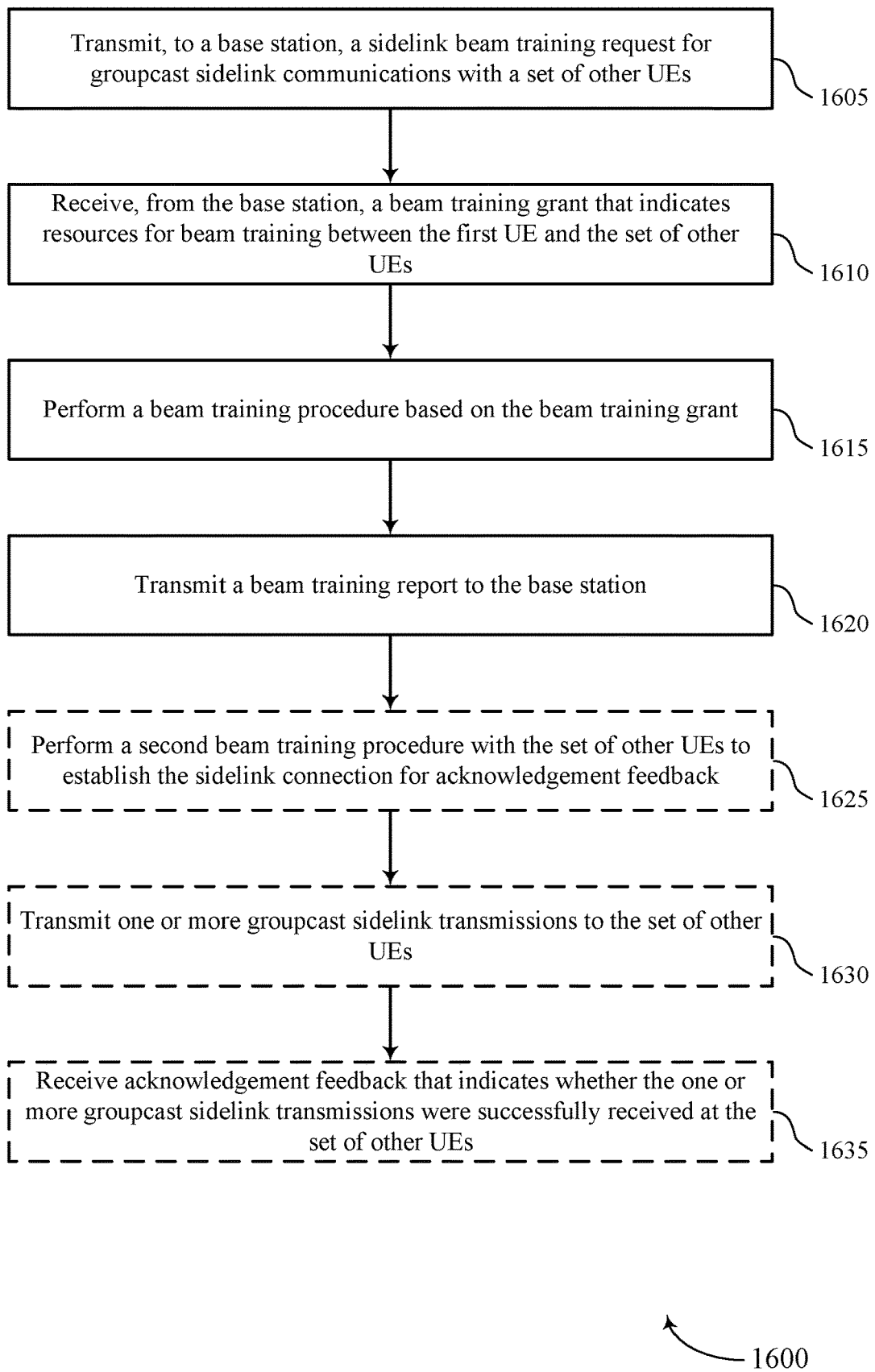

FIG. 16 shows a flowchart illustrating a method 1600 that supports sidelink groupcast beam training in accordance with one or more aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may transmit, to a base station, a sidelink beam training request for groupcast sidelink communications with one or more other UEs. The operations of 1605 may be performed according to the methods described herein. In some examples, aspects of the operations of 1605 may be performed by a groupcast communication manager as described with reference to FIGS. 6 through 9.

At 1610, the UE may receive, from the base station, a beam training grant that indicates resources for beam training between the first UE and the set of other UEs. The operations of 1610 may be performed according to the methods described herein. In some examples, aspects of the operations of 1610 may be performed by a sidelink configuration manager as described with reference to FIGS. 6 through 9.

At 1615, the UE may perform a beam training procedure based on the beam training grant. The operations of 1615 may be performed according to the methods described herein. In some examples, aspects of the operations of 1615 may be performed by a sidelink beam training manager as described with reference to FIGS. 6 through 9.

At 1620, the UE may transmit a beam training report to the base station. The operations of 1620 may be performed according to the methods described herein. In some examples, aspects of the operations of 1620 may be performed by a beam training report manager as described with reference to FIGS. 6 through 9.

At 1625, the UE may perform a second beam training procedure with the set of other UEs to establish the sidelink connection for acknowledgement feedback. The operations of 1625 may be performed according to the methods described herein. In some examples, aspects of the operations of 1625 may be performed by a groupcast HARQ feedback manager as described with reference to FIGS. 6 through 9.

At 1630, the UE may transmit one or more groupcast sidelink transmissions to the set of other UEs. The operations of 1630 may be performed according to the methods described herein. In some examples, aspects of the operations of 1630 may be performed by a groupcast communication manager as described with reference to FIGS. 6 through 9.

At 1635, the UE may receive acknowledgement feedback that indicates whether the one or more groupcast sidelink transmissions were successfully received at the set of other UEs. The operations of 1635 may be performed according to the methods described herein. In some examples, aspects of the operations of 1635 may be performed by a groupcast HARQ feedback manager as described with reference to FIGS. 6 through 9. In some cases, the acknowledgement feedback is received from each of the set of other UEs via a sidelink connection with the first UE.

Figure 17:
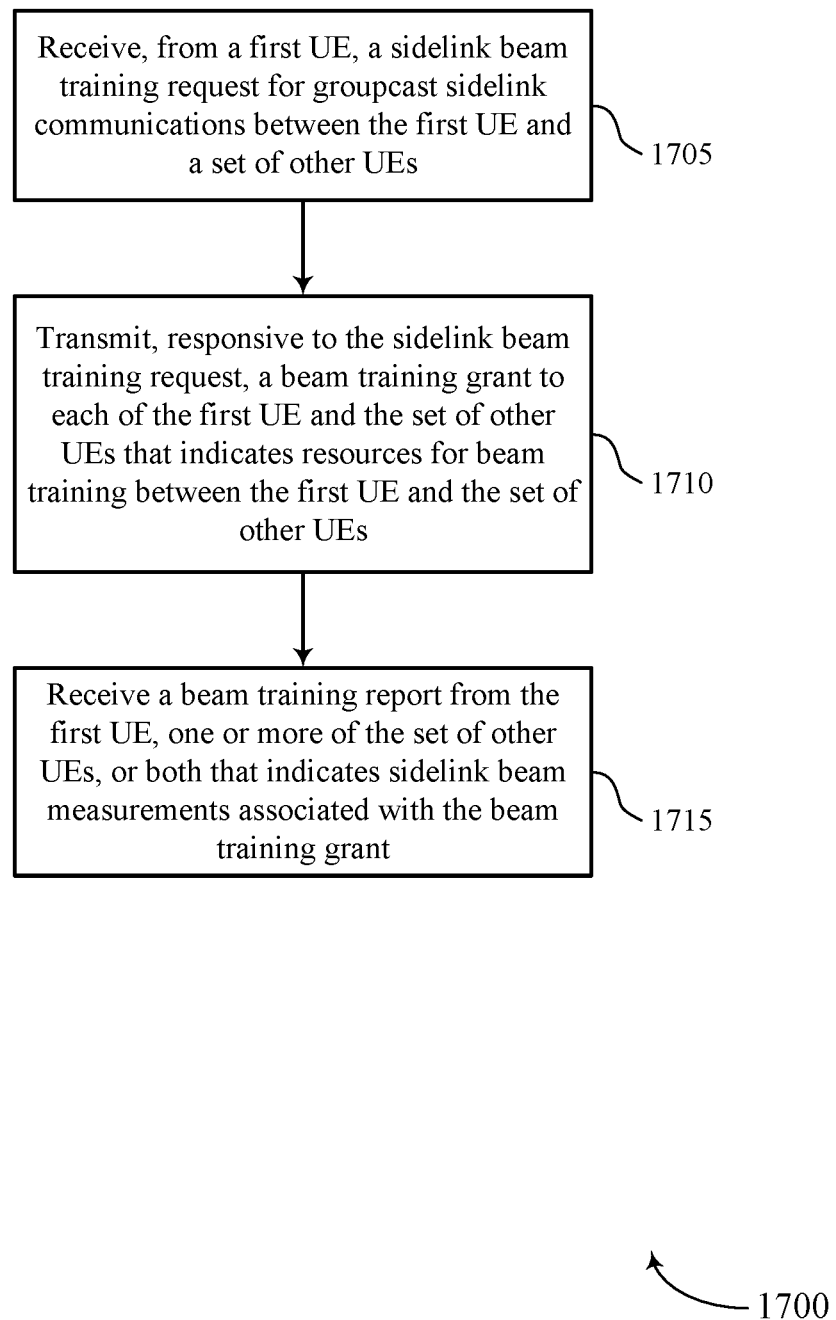

FIG. 17 shows a flowchart illustrating a method 1700 that supports sidelink groupcast beam training in accordance with one or more aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may receive, from a first UE, a sidelink beam training request for groupcast sidelink communications between the first UE and a set of other UEs. The operations of 1705 may be performed according to the methods described herein. In some examples, aspects of the operations of 1705 may be performed by a sidelink beam training manager as described with reference to FIGS. 10 through 13.

At 1710, the base station may transmit, responsive to the sidelink beam training request, a beam training grant to each of the first UE and the set of other UEs that indicates resources for beam training between the first UE and the set of other UEs. The operations of 1710 may be performed according to the methods described herein. In some examples, aspects of the operations of 1710 may be performed by a sidelink configuration manager as described with reference to FIGS. 10 through 13.

At 1715, the base station may receive a beam training report from the first UE, one or more of the set of other UEs, or both that indicates sidelink beam measurements associated with the beam training grant. The operations of 1715 may be performed according to the methods described herein. In some examples, aspects of the operations of 1715 may be performed by a beam training report manager as described with reference to FIGS. 10 through 13.

Figure 18:
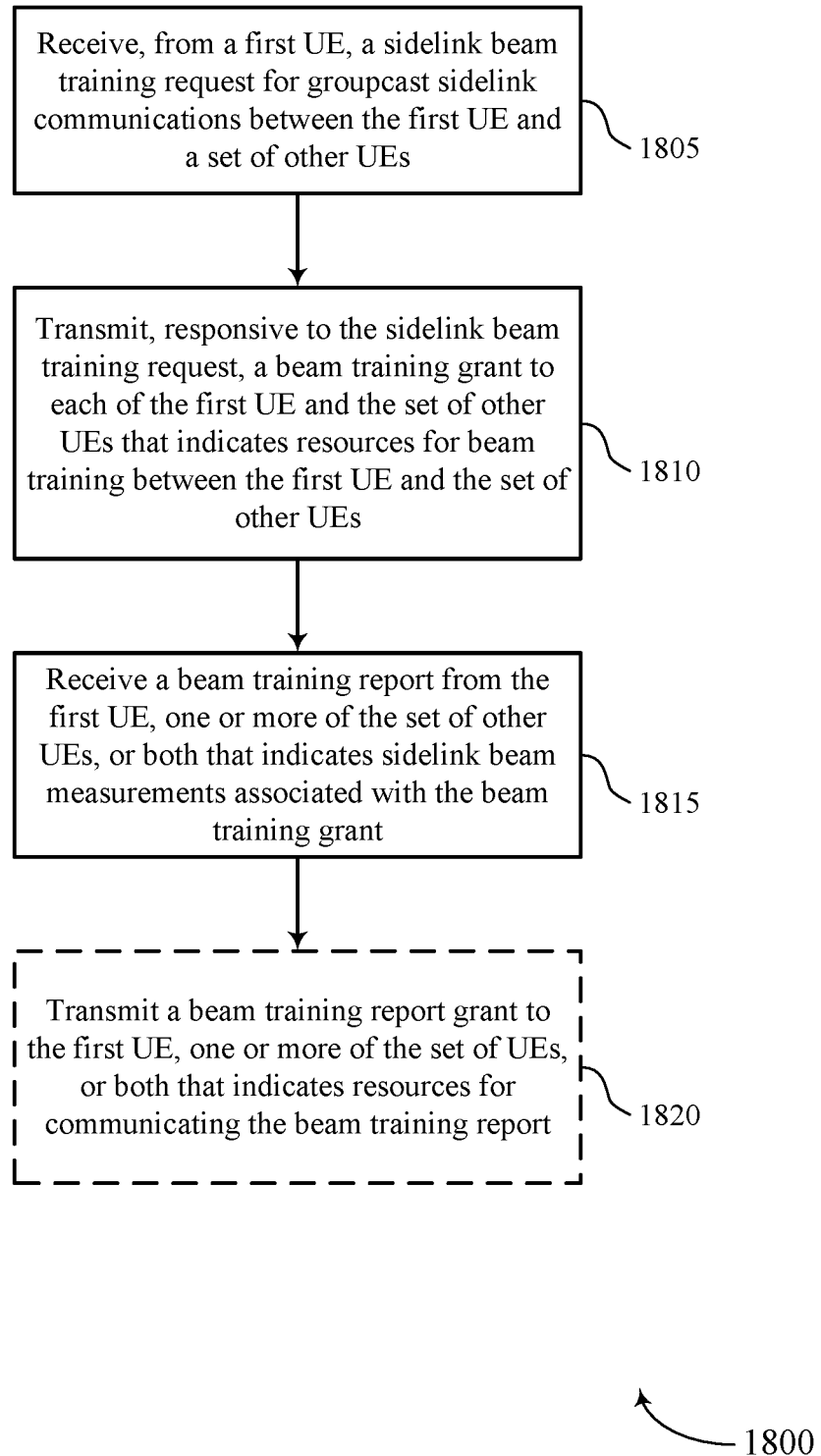

FIG. 18 shows a flowchart illustrating a method 1800 that supports sidelink groupcast beam training in accordance with one or more aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may receive, from a first UE, a sidelink beam training request for groupcast sidelink communications between the first UE and the set of other UEs. The operations of 1805 may be performed according to the methods described herein. In some examples, aspects of the operations of 1805 may be performed by a sidelink beam training manager as described with reference to FIGS. 10 through 13.

At 1810, the base station may transmit, responsive to the sidelink beam training request, a beam training grant to each of the first UE and the set of others UEs that indicates resources for beam training between the first UE and the set of other UEs. The operations of 1810 may be performed according to the methods described herein. In some examples, aspects of the operations of 1810 may be performed by a sidelink configuration manager as described with reference to FIGS. 10 through 13.

At 1815, the base station may receive a beam training report from the first UE, one or more of set of other UEs, or both that indicates sidelink beam measurements associated with the beam training grant. The operations of 1815 may be performed according to the methods described herein. In some examples, aspects of the operations of 1815 may be performed by a beam training report manager as described with reference to FIGS. 10 through 13.

At 1820, the base station may transmit a beam training report grant to the first UE, one or more of the set of UEs, or both that indicates resources for communicating the beam training report. The operations of 1820 may be performed according to the methods described herein. In some examples, aspects of the operations of 1820 may be performed by a sidelink communications manager as described with reference to FIGS. 10 through 13.

Figure 19:
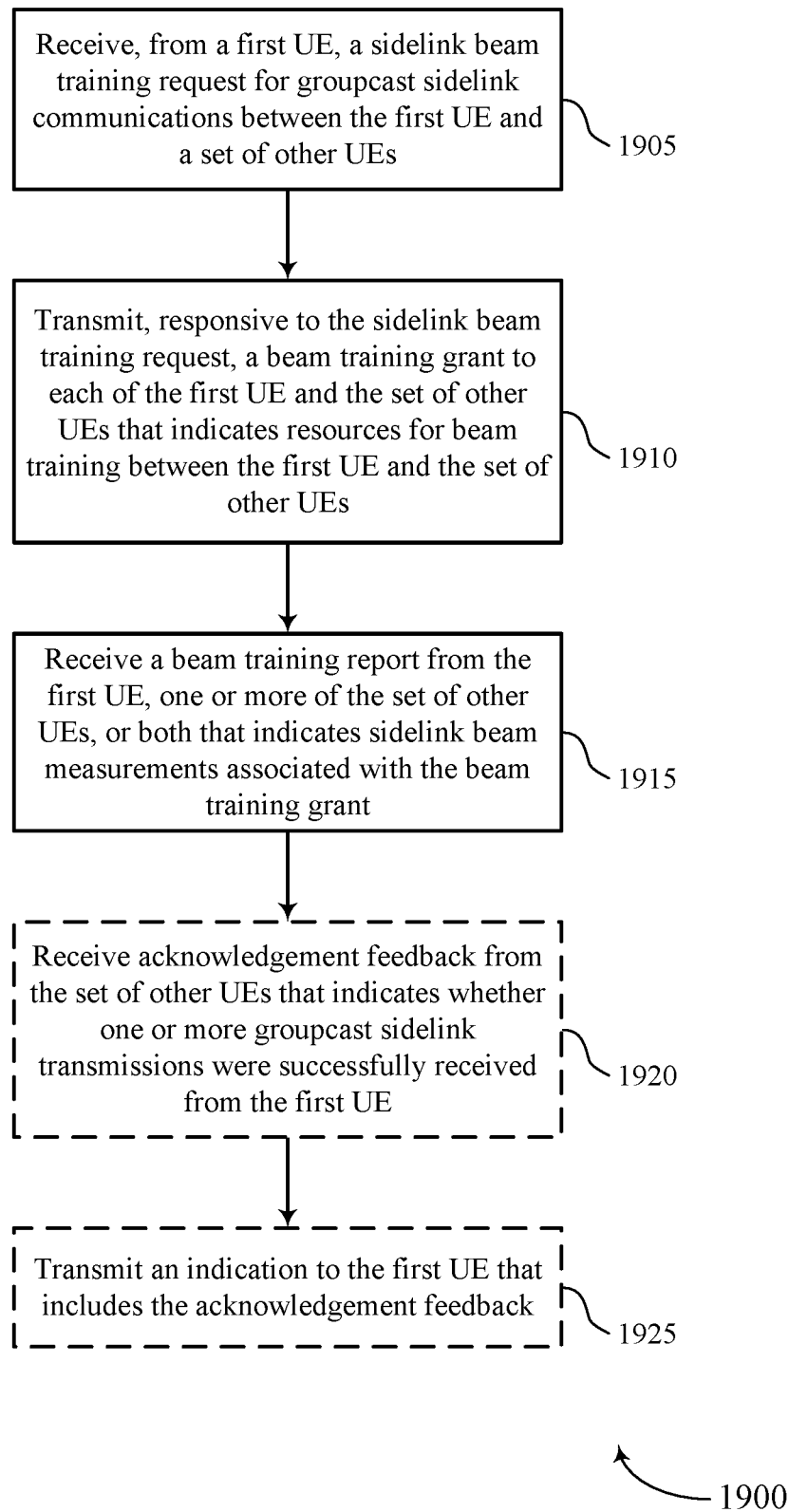

FIG. 19 shows a flowchart illustrating a method 1900 that supports sidelink groupcast beam training in accordance with one or more aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may receive, from a first UE, a sidelink beam training request for groupcast sidelink communications between the first UE and a set of other UEs. The operations of 1905 may be performed according to the methods described herein. In some examples, aspects of the operations of 1905 may be performed by a sidelink beam training manager as described with reference to FIGS. 10 through 13.

At 1910, the base station may transmit, responsive to the sidelink beam training request, a beam training grant to each of the first UE and the set of other UEs that indicates resources for beam training between the first UE and the set of other UEs. The operations of 1910 may be performed according to the methods described herein. In some examples, aspects of the operations of 1910 may be performed by a sidelink configuration manager as described with reference to FIGS. 10 through 13.

At 1915, the base station may receive a beam training report from the first UE, the one or more of the set of other UEs, or both that indicates sidelink beam measurements associated with the beam training grant. The operations of 1915 may be performed according to the methods described herein. In some examples, aspects of the operations of 1915 may be performed by a beam training report manager as described with reference to FIGS. 10 through 13.

At 1920, the base station may receive acknowledgement feedback from the set of other UEs that indicates whether one or more groupcast sidelink transmissions were successfully received from the first UE. The operations of 1920 may be performed according to the methods described herein. In some examples, aspects of the operations of 1920 may be performed by a groupcast HARQ feedback manager as described with reference to FIGS. 10 through 13.

At 1925, the base station may transmit an indication to the first UE that includes the acknowledgement feedback. The operations of 1925 may be performed according to the methods described herein. In some examples, aspects of the operations of 1925 may be performed by a groupcast HARQ feedback manager as described with reference to FIGS. 10 through 13.

Figure 20:
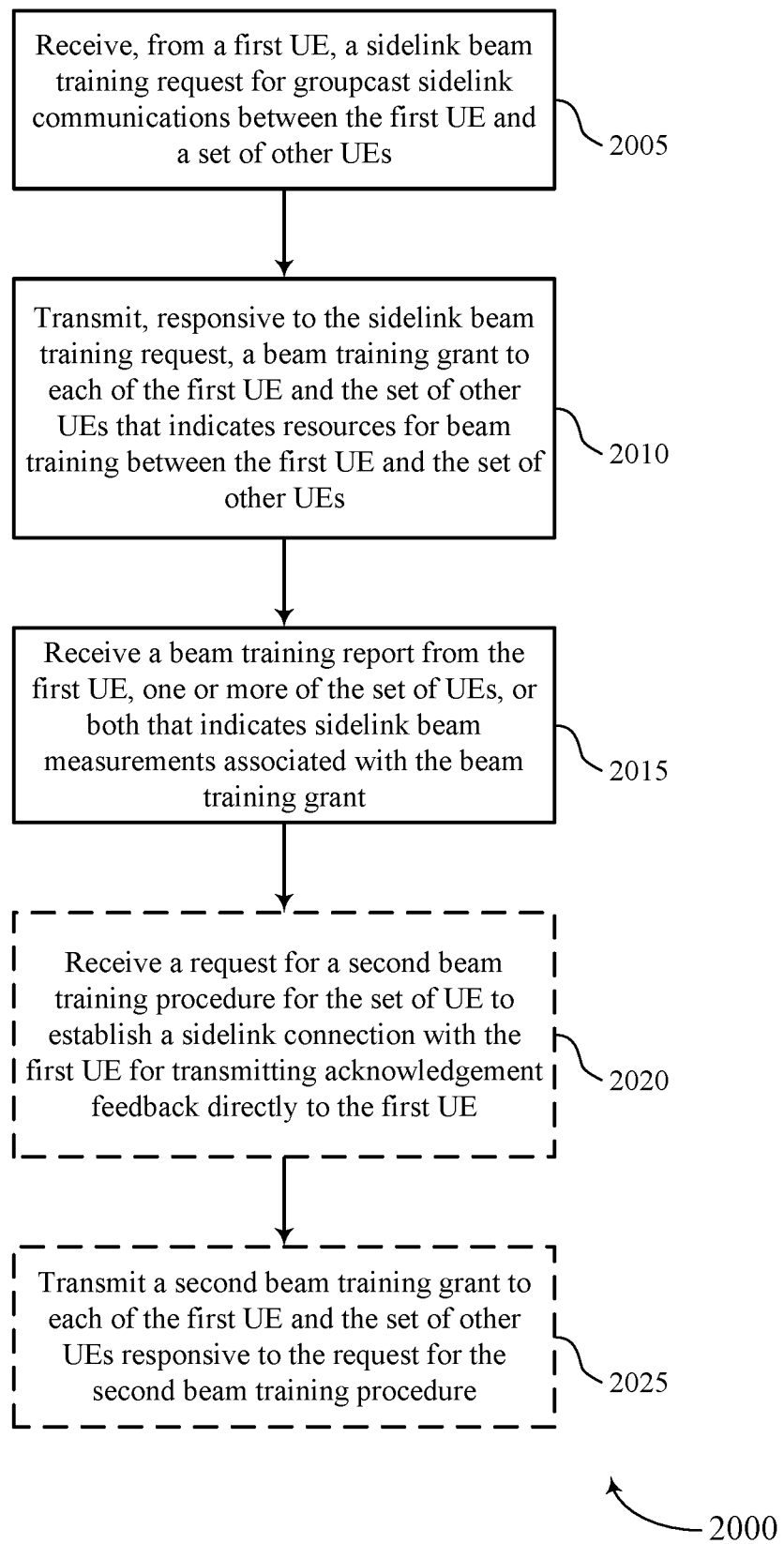

FIG. 20 shows a flowchart illustrating a method 2000 that supports sidelink groupcast beam training in accordance with one or more aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may receive, from a first UE, a sidelink beam training request for groupcast sidelink communications between the first UE and a set of other UEs. The operations of 2005 may be performed according to the methods described herein. In some examples, aspects of the operations of 2005 may be performed by a sidelink beam training manager as described with reference to FIGS. 10 through 13.

At 2010, the base station may transmit, responsive to the sidelink beam training request, a beam training grant to each of the first UE and the set of other UEs that indicates resources for beam training between the first UE and the set of other UEs. The operations of 2010 may be performed according to the methods described herein. In some examples, aspects of the operations of 2010 may be performed by a sidelink configuration manager as described with reference to FIGS. 10 through 13.

At 2015, the base station may receive a beam training report from the first UE, the one or more of the set of other UEs, or both that indicates sidelink beam measurements associated with the beam training grant. The operations of 2015 may be performed according to the methods described herein. In some examples, aspects of the operations of 2015 may be performed by a beam training report manager as described with reference to FIGS. 10 through 13.

At 2020, the base station may receive a request for a second beam training procedure for the set of other UEs to establish a sidelink connection with the first UE for transmitting acknowledgement feedback directly to the first UE. The operations of 2020 may be performed according to the methods described herein. In some examples, aspects of the operations of 2020 may be performed by a groupcast HARQ feedback manager as described with reference to FIGS. 10 through 13.

At 2025, the base station may transmit a second beam training grant to each of the first UE and the set of other UEs responsive to the request for the second beam training procedure. The operations of 2025 may be performed according to the methods described herein. In some examples, aspects of the operations of 2025 may be performed by a groupcast HARQ feedback manager as described with reference to FIGS. 10 through 13.

Figure 21:
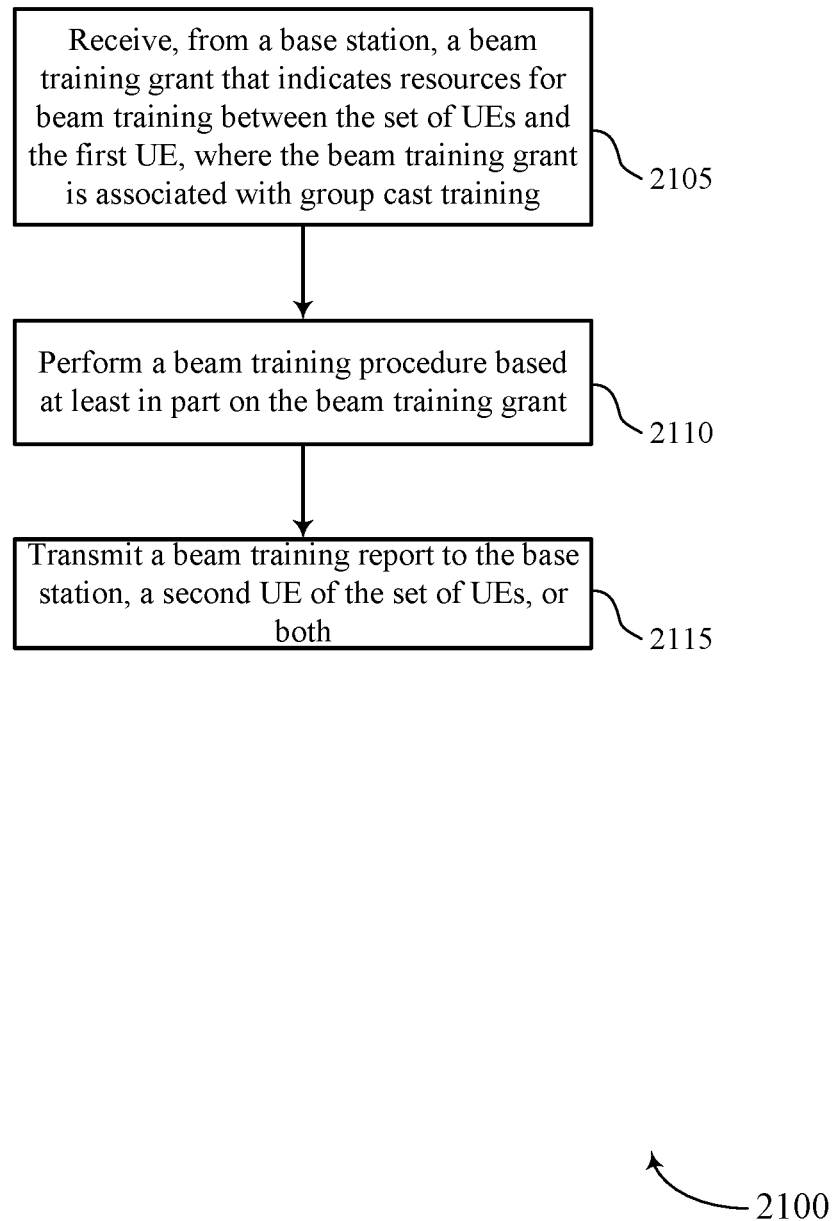

FIG. 21 shows a flowchart illustrating a method 2100 that supports sidelink groupcast beam training in accordance with one or more aspects of the present disclosure. The operations of method 2100 may be implemented by a UE 115 or its components as described herein. For example, the operations of method 2100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 2105, a first UE of a set of UEs may receive, from a base station, a beam training grant that indicates resources for beam training between the set of UEs and the first UE, where the beam training grant is associated with group cast training. The operations of 2105 may be performed according to the methods described herein. In some examples, aspects of the operations of 2105 may be performed by a sidelink configuration manager as described with reference to FIGS. 6 through 9.

At 2110, the set of UEs may perform a beam training procedure based on the beam training grant. The operations of 2110 may be performed according to the methods described herein. In some examples, aspects of the operations of 2110 may be performed by a sidelink beam training manager as described with reference to FIGS. 6 through 9.

At 2115, the set of UEs may transmit a beam training report to the base station, a second UE of the set of UEs, or both. The operations of 2115 may be performed according to the methods described herein. In some examples, aspects of the operations of 2115 may be performed by a beam training report manager as described with reference to FIGS. 6 through 9.

Aspect 1: A method for wireless communication at a first user equipment (UE), comprising: transmitting, to a base station, a sidelink beam training request for groupcast sidelink communications with a plurality of other UEs, receiving, from the base station, a beam training grant that indicates resources for beam training between the first UE and the plurality of other UEs, performing a beam training procedure based at least in part on the beam training grant, and transmitting a beam training report to the base station.

Aspect 2: The method of aspect 1, further comprising: receiving, from the base station, a beam training report grant that indicates resources for communicating the beam training report.

Aspect 3: The method of aspect 1 or 2, wherein the sidelink beam training request indicates a requested number of beams for transmitting beam training signals.

Aspect 4: The method of any one of aspects 1 through 3, wherein the sidelink beam training request indicates a preference for transmitting to a sub-group of UEs that are capable of groupcast sidelink communications.

Aspect 5: The method of aspect 4, further comprising: receiving, from the base station, a sidelink groupcast communications grant for transmission of a sidelink groupcast communication to the plurality of other UEs, and wherein the plurality of other UEs are in the sub-group of UEs.

Aspect 6: The method of any one of aspects 1 through 5, wherein the performing the beam training procedure comprises: transmitting a training signal on each of two or more transmission beams for measurement by the plurality of other UEs.

Aspect 7: The method of any one of aspects 1 through 6, wherein the beam training report indicates one or more of a resource in which a training signal was transmitted, identifications of one or more training beams, a received signal quality of a training signal received, beams used to receive the training signal, a resource in which the training signal was received, or any combinations thereof.

Aspect 8: The method of any one of aspects 1 through 6, wherein the beam training report indicates a subset of the plurality of other UEs that are reachable by the first UE.

Aspect 9: The method of any one of aspects 1 through 8, wherein a connectivity map can be deduced from the beam training report.

Aspect 10: The method of any one of the aspects 1 through 9, further comprising: transmitting one or more groupcast sidelink transmissions to the plurality of other UEs, and receiving acknowledgement feedback that indicates whether the one or more groupcast sidelink transmissions were successfully received at the plurality of other UEs.

Aspect 11: The method of aspect 10, wherein the acknowledgement feedback is received from the base station, and wherein each of the plurality of other UEs transmits associated acknowledgment feedback to the base station.

Aspect 12: The method of aspect 10 or 11, wherein the acknowledgement feedback is received from each of the plurality of other UEs via a sidelink connection with the first UE.

Aspect 13: The method of any one of the aspects 1 through 12, further comprising: performing a second beam training procedure with the plurality of other UEs to establish the sidelink connection for acknowledgement feedback.

Aspect 14: The method of any one of the aspects 1 through 13, further comprising: receiving, responsive to the beam training report, a sidelink grant from the base station that indicates sidelink resources for groupcast sidelink communications with the plurality of other UEs.

Aspect 15: The method of aspect 14, wherein the sidelink grant is received in a downlink control information message from the base station.

Aspect 16: The method of aspect 15, wherein the downlink control information message indicates one or more of an identification of a groupcast transmitting UE for the groupcast sidelink communications, a list of at least one other UE that is to receive the groupcast sidelink communications, a transmission beam that is to be used by the groupcast transmitting UE, the sidelink resources for the groupcast sidelink communications, or any combinations thereof.

Aspect 17: A method for wireless communication at a base station, comprising: receiving, from a first user equipment (UE), a sidelink beam training request for groupcast sidelink communications between the first UE and a plurality of other UEs, transmitting, responsive to the sidelink beam training request, a beam training grant to each of the first UE and the plurality of other UEs that indicates resources for beam training between the first UE and the plurality of other UEs, and receiving a beam training report from the first UE, one or more of the plurality of other UEs, or both that indicates sidelink beam measurements associated with the beam training grant.

Aspect 18: The method of aspect 17, further comprising: transmitting a beam training report grant to the first UE, one or more of the plurality of other UEs, or both that indicates resources for communicating the beam training report.

Aspect 19: The method of aspect 17 or 18, wherein the sidelink beam training request indicates a requested number of beams for transmitting beam training signals, and wherein the beam training grant is determined based at least in part on the requested number of beams.

Aspect 20: The method of any one of the aspects 17 through 19, wherein the sidelink beam training request indicates a preference for transmitting to a sub-group of UEs that are capable of groupcast sidelink communications, and wherein the beam training grant is determined based at least in part on the preference.

Aspect 21: The method of any one of the aspects 17 through 20, wherein the beam training report indicates one or more of a resource in which a training signal was transmitted, identifications of one or more training beams, a received signal quality of a training signal received, beams used to receive the training signal, a resource in which the training signal was received, or any combination thereof.

Aspect 22: The method of any one of the aspects 17 through 21, wherein the beam training report from each UE indicates a subset of the plurality of other UEs that are reachable by the UE.

Aspect 23: The method of any one of the aspects 17 through 22, further comprising: determining a UE connectivity map based at least in part on the beam training report from each UE.

Aspect 24: The method of any of the aspects 17 through 23, further comprising: receiving acknowledgement feedback from the plurality of other UEs that indicates whether one or more groupcast sidelink transmissions were successfully received from the first UE, and transmitting an indication to the first UE that includes the acknowledgement feedback.

Aspect 25: The method of any of the aspects 17 through 24, further comprising: receiving a request for a second beam training procedure for the plurality of other UEs to establish a sidelink connection with the first UE for transmitting acknowledgement feedback directly to the first UE, and transmitting a second beam training grant to each of the first UE and the plurality of other UEs responsive to the request for the second beam training procedure.

Aspect 26: The method of any of the aspects 17 through 25, further comprising: transmitting a sidelink grant to at least the first UE and the plurality of other UEs that indicates sidelink resources for groupcast sidelink communications between the first UE and the plurality of other UEs based at least in part on the beam training report.

Aspect 27: The method of aspect 26, wherein the sidelink grant is transmitted in a downlink control information communication.

Aspect 28: The method of aspect 27, wherein the downlink control information indicates one or more of an identification of a groupcast transmitting UE for the groupcast sidelink communications, a list of at least one other UE that is to receive the groupcast sidelink communications, a transmission beam that is to be used by the groupcast transmitting UE, the sidelink resources for the groupcast sidelink communications, or any combinations thereof.

Aspect 29: A method for wireless communication at a first user equipment (UE) of a plurality of UEs, comprising: receiving, from the base station, a beam training grant that indicates resources for beam training between the plurality of UEs and the first UE, wherein the beam training grant is associated with groupcast beam training, performing a beam training procedure based at least in part on the beam training grant, and transmitting a beam training report to the base station, a second UE of the plurality of UEs, or both.

Aspect 30: An apparatus for wireless communication comprising at least one means for performing a method of any one of aspects 1 through 16.

Aspect 31: An apparatus for wireless communication comprising a processor and memory coupled to the processor, the processor and memory configured to perform a method of any one of aspects 1 through 16.

Aspect 32: A non-transitory computer-readable medium storing code for wireless communication, the code comprising instructions executable by a processor to perform a method of any one of aspects 1 through 16.

Aspect 33: An apparatus for wireless communication comprising at least one means for performing a method of any one of aspects 17 through 28.

Aspect 34: An apparatus for wireless communication comprising a processor and memory coupled to the processor, the processor and memory configured to perform a method of any one of aspects 17 through 28.

Aspect 35: A non-transitory computer-readable medium storing code for wireless communication, the code comprising instructions executable by a processor to perform a method of any one of aspects 17 through 28.

Aspect 36: An apparatus for wireless communication comprising at least one means for performing a method of aspect 29.

Aspect 37: An apparatus for wireless communication comprising a processor and memory coupled to the processor, the processor and memory configured to perform a method of aspect 29.

Aspect 38: A non-transitory computer-readable medium storing code for wireless communication, the code comprising instructions executable by a processor to perform a method of aspect 29.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communication at a first user equipment (UE), comprising:
    transmitting, to a network device, a sidelink beam training request for groupcast sidelink communications with a plurality of other UEs;

receiving, from the network device, a beam training grant that indicates resources for a beam training procedure between the first UE and the plurality of other UEs;

performing the beam training procedure using the resources based at least in part on the beam training grant, the performing the beam training procedure comprising communicating, to the plurality of other UEs and using the resources, beam training signaling via a plurality of directional beams for measurement by the plurality of other UEs;

transmitting a beam training report to the network device;

receiving, from the network device, an indication of a directional beam of the plurality of directional beams based at least in part on the beam training report; and transmitting a groupcast sidelink communication to the plurality of other UEs using the directional beam.

2. The method of claim 1, further comprising:
receiving, from the network device, a beam training report grant that indicates resources for communicating the beam training report.

3. The method of claim 1, wherein the sidelink beam training request indicates a requested number of beams for transmitting beam training signals.

4. The method of claim 1, wherein the sidelink beam training request indicates a preference for transmitting to a sub-group of UEs that are capable of the groupcast sidelink communications.

5. The method of claim 4, further comprising:
receiving, from the network device, a sidelink groupcast communications grant for transmission of the groupcast sidelink communication to the plurality of other UEs, and wherein the plurality of other UEs are in the sub-group of UEs.

6. The method of claim 1, the communicating the beam training signaling comprising:
transmitting the beam training signaling via the plurality of directional beams for measurement by the plurality of other UEs.

7. The method of claim 1, wherein the beam training report indicates one or more of a resource in which a training signal was transmitted, identifications of one or more training beams, a received signal quality of a training signal received, beams used to receive the training signal, a resource in which the training signal was received, or any combinations thereof.

8. The method of claim 1, wherein the beam training report indicates a subset of the plurality of other UEs that are reachable by the first UE.

9. The method of claim 8, wherein a connectivity map can be deduced from the beam training report.

10. The method of claim 1, further comprising:
receiving one or more acknowledgement feedback messages that indicate whether the groupcast sidelink communication was successfully received at the plurality of other UEs.

11. The method of claim 10, wherein the one or more acknowledgement feedback messages are received from the network device.

12. The method of claim 10, wherein the one or more acknowledgement feedback messages are received from each of the plurality of other UEs via a sidelink connection with the first UE.

13. The method of claim 12, further comprising:
performing a second beam training procedure with the plurality of other UEs to establish the sidelink connection for acknowledgement feedback.

14. The method of claim 1, further comprising:
receiving, responsive to the beam training report, a sidelink grant from the network device that indicates sidelink resources for transmission of the groupcast sidelink communication to the plurality of other UEs.

15. The method of claim 14, wherein the sidelink grant is received in a downlink control information message from the network device.

16. The method of claim 15, wherein the downlink control information message indicates one or more of an identification of a groupcast transmitting UE for the groupcast sidelink communications, a list of at least one other UE that is to receive the groupcast sidelink communications, the directional beam that is to be used by the groupcast transmitting UE, the sidelink resources for the groupcast sidelink communications, or any combinations thereof.

17. A method for wireless communication at a network device, comprising:
receiving a sidelink beam training request for groupcast sidelink communications between a first user equipment (UE) and a plurality of other UEs;

transmitting, responsive to the sidelink beam training request, a beam training grant to each of the first UE and the plurality of other UEs that indicates resources for a beam training procedure between the first UE and the plurality of other UEs;

receiving one or more beam training reports from the first UE, one or more of the plurality of other UEs, or both that indicate sidelink beam measurements associated with beam training signaling received by the plurality of other UEs via a plurality of directional beams using the resources; and transmitting, based at least in part on receiving the one or more beam training reports, an indication of a directional beam of the plurality of directional beams, wherein the directional beam is for performing the groupcast sidelink communications with the plurality of other UEs.

18. The method of claim 17, further comprising:
transmitting a beam training report grant to the first UE, one or more of the plurality of other UEs, or both that indicates resources for communicating the one or more beam training reports.

19. The method of claim 17, wherein the sidelink beam training request indicates a requested number of beams for transmitting beam training signals, and wherein the beam training grant is determined based at least in part on the requested number of beams.

20. The method of claim 17, wherein the sidelink beam training request indicates a preference for transmitting to a sub-group of UEs that are capable of the groupcast sidelink communications, and wherein the beam training grant is determined based at least in part on the preference.

21. The method of claim 17, wherein the one or more beam training reports indicate one or more of a resource in which a training signal was transmitted, identifications of one or more training beams, a received signal quality of a training signal received, beams used to receive the training signal, a resource in which the training signal was received, or any combination thereof.

22. The method of claim 17, wherein the one or more beam training reports from each UE indicate a subset of the plurality of other UEs that are reachable by the UE.

23. The method of claim 22, further comprising:
determining a UE connectivity map based at least in part on the one or more beam training reports from each UE.

24. The method of claim 17, further comprising:
receiving one or more acknowledgement feedback messages from the plurality of other UEs that indicate whether a groupcast sidelink communication was successfully received from the first UE; and
transmitting an indication to the first UE that includes the one or more acknowledgement feedback messages.

25. The method of claim 17, further comprising:
receiving a request for a second beam training procedure for the plurality of other UEs to establish a sidelink connection with the first UE for transmitting acknowledgement feedback directly to the first UE; and
transmitting a second beam training grant to each of the first UE and the plurality of other UEs responsive to the request for the second beam training procedure.

26. The method of claim 17, further comprising:
transmitting a sidelink grant to the first UE and the plurality of other UEs that indicates sidelink resources for a groupcast sidelink communication between the first UE and the plurality of other UEs based at least in part on the one or more beam training reports.

27. The method of claim 26, wherein the sidelink grant is transmitted in a downlink control information message.

28. The method of claim 27, wherein the downlink control information message indicates one or more of an identification of a groupcast transmitting UE for the groupcast sidelink communications, a list of at least one other UE that is to receive the groupcast sidelink communications, the directional beam that is to be used by the groupcast transmitting UE, the sidelink resources for the groupcast sidelink communications, or any combinations thereof.

29. A method for wireless communication at a first user equipment (UE) of a plurality of UEs, comprising:
receiving, from a network device, a beam training grant that indicates resources for a beam training procedure between the first UE and a second UE, wherein the beam training grant is associated with groupcast beam training;
performing the beam training procedure based at least in part on the beam training grant, the performing the beam training procedure comprising communicating, using the resources, beam training signaling via a plurality of directional beams for measurement by the first UE;
transmitting a beam training report to the network device, the second UE, or both; and
receiving a groupcast sidelink communication using a directional beam of the plurality of directional beams, wherein the directional beam is based at least in part on the beam training report.

30. An apparatus for wireless communication at a first user equipment (UE), comprising:
one or more memories; and
one or more processors coupled with the one or more memories and configured to cause the first UE to:
transmit, to a network device, a sidelink beam training request for groupcast sidelink communications with a plurality of other UEs;
receive, from the network device, a beam training grant that indicates resources for a beam training procedure between the first UE and the plurality of other UEs;
perform the beam training procedure using the resources based at least in part on the beam training grant, wherein, to perform the beam training procedure, the one or more processors are configured to cause the first UE to communicate, to the plurality of other UEs and using the resources, beam training signaling via a plurality of directional beams for measurement by the plurality of other UEs;
transmit a beam training report to the network device;
receive, from the network device, an indication of a directional beam of the plurality of directional beams based at least in part on the beam training report; and
transmit a groupcast sidelink communication to the plurality of other UEs using the directional beam.

31. The method of claim 29, further comprising:
receiving, from the network device, a beam training report grant that indicates resources for communicating the beam training report.

32. The method of claim 29, wherein the beam training report indicates one or more of a resource in which a training signal was transmitted, identifications of one or more training beams, a received signal quality of a training signal received, beams used to receive the training signal, a resource in which the training signal was received, or any combinations thereof.

33. The apparatus of claim 30, further comprising:
one or more antennas, wherein the one or more processors are configured to cause the first UE to:
receive, from the network device via the one or more antennas, a beam training report grant that indicates resources for communicating the beam training report.

34. The apparatus of claim 30, wherein the sidelink beam training request indicates a requested number of beams for transmitting beam training signals.

35. An apparatus for wireless communication at a network device, comprising:
one or more memories; and
one or more processors coupled with the one or more memories and configured to cause the network device to:
receive a sidelink beam training request for groupcast sidelink communications between a first user equipment (UE) and a plurality of other UEs;
transmit, responsive to the sidelink beam training request, a beam training grant to each of the first UE and the plurality of other UEs that indicates resources for a beam training procedure between the first UE and the plurality of other UEs;
receive one or more beam training reports from the first UE, one or more of the plurality of other UEs, or both that indicate sidelink beam measurements associated with beam training signaling received by the plurality of other UEs via a plurality of directional beams using the resources; and
transmit, based at least in part on the one or more beam training reports, an indication of a directional beam of the plurality of directional beams, wherein the directional beam is to perform the groupcast sidelink communications with the plurality of other UEs.

36. The apparatus of claim 35, further comprising:
one or more antennas, wherein the one or more processors are configured to cause the network device to:
transmit, via the one or more antennas, a beam training report grant to the first UE, one or more of the plurality of other UEs, or both that indicates resources for communicating the one or more beam training reports.

37. The apparatus of claim 35, wherein the sidelink beam training request indicates a requested number of beams for transmitting beam training signals, and wherein the beam training grant is determined based at least in part on the requested number of beams.

38. An apparatus for wireless communication at a first user equipment (UE) of a plurality of UEs, comprising:
one or more memories; and
one or more processors coupled with the one or more memories and configured to cause the first UE to:
receive, from a network device, a beam training grant that indicates resources for a beam training procedure between the first UE and a second UE, wherein the beam training grant is associated with groupcast beam training;
perform the beam training procedure based at least in part on the beam training grant, wherein, to perform the beam training procedure, the one or more processors are configured to cause the first UE to communicate, using the resources, beam training signaling via a plurality of directional beams for measurement by the first UE;
transmit a beam training report to the network device, the second UE, or both; and
receive a groupcast sidelink communication using a directional beam of the plurality of directional beams, wherein the directional beam is based at least in part on the beam training report.

39. The apparatus of claim 38, further comprising:
one or more antennas, wherein the one or more processors are configured to cause the first UE to:
receive, from the network device via the one or more antennas, a beam training report grant that indicates resources for communicating the beam training report.

40. The apparatus of claim 38, wherein the beam training report indicates one or more of a resource in which a training signal was transmitted, identifications of one or more training beams, a received signal quality of a training signal received, beams used to receive the training signal, a resource in which the training signal was received, or any combinations thereof.

41. A non-transitory computer-readable medium storing code, the code comprising instructions executable by one or more processors to cause a first user equipment (UE) to:
transmit, to a network device, a sidelink beam training request for groupcast sidelink communications with a plurality of other UEs;
receive, from the network device, a beam training grant that indicates resources for a beam training procedure between the first UE and the plurality of other UEs;
perform the beam training procedure using the resources based at least in part on the beam training grant, wherein to perform the beam training procedure, the instructions are executable by the one or more processors to cause the first UE to communicate, to the plurality of other UEs and using the resources, beam training signaling via a plurality of directional beams for measurement by the plurality of other UEs;
transmit a beam training report to the network device;
receive, from the network device, an indication of a directional beam of the plurality of directional beams based at least in part on the beam training report; and
transmit a groupcast sidelink communication to the plurality of other UEs using the directional beam.

42. The non-transitory computer-readable medium of claim 41, wherein the instructions are further executable by the one or more processors to cause the first UE to:
receive, from the network device, a beam training report grant that indicates resources for communicating the beam training report.

43. The non-transitory computer-readable medium of claim 41, wherein the sidelink beam training request indicates a requested number of beams for transmitting beam training signals.

44. A non-transitory computer-readable medium storing code, the code comprising instructions executable by one or more processors to cause a network device to:
receive a sidelink beam training request for groupcast sidelink communications between a first user equipment (UE) and a plurality of other UEs;
transmit, responsive to the sidelink beam training request, a beam training grant to each of the first UE and the plurality of other UEs that indicates resources for a beam training procedure between the first UE and the plurality of other UEs;
receive one or more beam training reports from the first UE, one or more of the plurality of other UEs, or both that indicate sidelink beam measurements associated with beam training signaling received by the plurality of other UEs via a plurality of directional beams using the resources; and
transmit, based at least in part on receiving the one or more beam training reports, an indication of a directional beam of the plurality of directional beams, wherein the directional beam is for performing the groupcast sidelink communications with the plurality of other UEs.

45. The non-transitory computer-readable medium of claim 44, wherein the instructions are further executable by the one or more processors to cause the network device to:
transmit a beam training report grant to the first UE, one or more of the plurality of other UEs, or both that indicates resources for communicating the one or more beam training reports.

46. The non-transitory computer-readable medium of claim 44, wherein the sidelink beam training request indicates a requested number of beams for transmitting beam training signals, and wherein the beam training grant is determined based at least in part on the requested number of beams.

47. A non-transitory computer-readable medium storing code, the code comprising instructions executable by one or more processors to cause a first user equipment (UE) to:
receive, from a network device, a beam training grant that indicates resources for a beam training procedure between the first UE and a second UE, wherein the beam training grant is associated with groupcast beam training;
perform the beam training procedure based at least in part on the beam training grant, wherein to perform the beam training procedure, the instructions are executable by the one or more processors to cause the first UE to communicate, using the resources, beam training signaling via a plurality of directional beams for measurement by the first UE;
transmit a beam training report to the network device, the second UE, or both; and
receive a groupcast sidelink communication using a directional beam of the plurality of directional beams, wherein the directional beam is based at least in part on the beam training report.

48. The non-transitory computer-readable medium of claim 47, wherein the instructions are further executable by the one or more processors to cause the first UE to:
receive, from the network device, a beam training report grant that indicates resources for communicating the beam training report.

49. The non-transitory computer-readable medium of claim 47, wherein the beam training report indicates one or more of a resource in which a training signal was transmitted, identifications of one or more training beams, a received signal quality of a training signal received, beams used to receive the training signal, a resource in which the training signal was received, or any combinations thereof.

* * * * *